(12) United States Patent
Tani et al.

(10) Patent No.: US 10,150,854 B2
(45) Date of Patent: *Dec. 11, 2018

(54) POLYCARBONATE RESIN COMPOSITION

(71) Applicant: TEIJIN LIMITED, Osaka (JP)

(72) Inventors: Takushi Tani, Osaka (JP); Hiroshi Okamoto, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 68 days.

This patent is subject to a terminal disclaimer.

(21) Appl. No.: 15/304,718

(22) PCT Filed: Apr. 20, 2015

(86) PCT No.: PCT/JP2015/061946
§ 371 (c)(1),
(2) Date: Oct. 17, 2016

(87) PCT Pub. No.: WO2015/163268
PCT Pub. Date: Oct. 29, 2015

(65) Prior Publication Data
US 2017/0037220 A1 Feb. 9, 2017

(30) Foreign Application Priority Data

Apr. 23, 2014 (JP) ................. 2014-089257

(51) Int. Cl.
| | | |
|---|---|---|
| C08K 5/3435 | (2006.01) |
| C08K 5/3475 | (2006.01) |
| C08K 5/526 | (2006.01) |
| C08K 5/3472 | (2006.01) |
| C08K 5/49 | (2006.01) |
| C08L 69/00 | (2006.01) |
| C08G 63/64 | (2006.01) |
| C08K 5/00 | (2006.01) |
| C08G 64/02 | (2006.01) |
| C08G 64/30 | (2006.01) |

(52) U.S. Cl.
CPC ............ *C08K 5/3435* (2013.01); *C08G 63/64* (2013.01); *C08G 64/0208* (2013.01); *C08G 64/305* (2013.01); *C08K 5/005* (2013.01); *C08K 5/3472* (2013.01); *C08K 5/3475* (2013.01); *C08K 5/49* (2013.01); *C08K 5/526* (2013.01); *C08L 69/00* (2013.01)

(58) Field of Classification Search
CPC .... C08K 5/3435; C08K 5/005; C08K 5/3472; C08K 5/49; C08K 5/526; C08K 5/3475; C08G 64/0208; C08G 64/305; C08G 63/64; C08L 69/00
USPC .......................................................... 524/91
See application file for complete search history.

(56) References Cited

U.S. PATENT DOCUMENTS

| | | | | |
|---|---|---|---|---|
| 9,096,710 B2* | 8/2015 | Motoyoshi | ......... | C08G 64/1608 |
| 2013/0012628 A1* | 1/2013 | Sasaki | ................ | C08G 64/0208 |
| | | | | 524/103 |
| 2015/0087804 A1 | 3/2015 | Motoyoshi et al. | | |

FOREIGN PATENT DOCUMENTS

| | | |
|---|---|---|
| JP | 2009-74031 | 4/2009 |
| JP | 2009-102537 | 5/2009 |
| JP | 2011-219746 | 11/2011 |
| JP | 2012-41467 | 3/2012 |
| JP | 2013-227558 | 11/2013 |

(Continued)

OTHER PUBLICATIONS

JP 2009-102537 A, machine translation, JPO Japan Platform for Patent Information (J-PlatPat). (Year: 2009).*
JP 2013-227558 A, machine translation, JPO Japan Platform for Patent Information (J-PlatPat). (Year: 2013).*
International Search Report dated Jun. 2, 2015 in International (PCT) Application No. PCT/JP2015/061946.
Extended European Search Report dated Apr. 3, 2017 in corresponding European Application No. 15783907.7.

*Primary Examiner* — Josephine L Chang
(74) *Attorney, Agent, or Firm* — Wenderoth, Lind & Ponack, L.L.P.

(57) ABSTRACT

A polycarbonate resin composition comprising a polycarbonate resin and 0.001 to 1 parts by weight of an N—R type (R represents an alkyl group) hindered amine-based optical stabilizer per 100 parts by weight of the polycarbonate resin, wherein the polycarbonate resin comprises 40 mol % or more of a recurring unit (A) represented by the following formula, a metal compound comprising a negative ion represented by the following formula (B) and a positive ion constituted by a metal is used as a polymerization catalyst in an amount of $1\times10^{-9}$ to $1\times10^{-5}$ molar equivalent relative to the total diol compounds used for polymerization, and the resin composition has excellent heat resistance, a low water absorption coefficient and high transparency, and suppresses deterioration during long-term use, wherein $R^1$ is an alkylene group, a cycloalkylene group, or an arylalkylene group which has 1 to 22 carbon atoms and may be linear or branched.

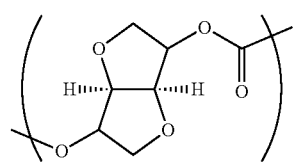

(A)

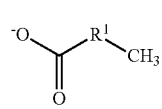

(B)

16 Claims, No Drawings

(56) References Cited

FOREIGN PATENT DOCUMENTS

| | | |
|---|---|---|
| JP | 2014-504669 | 2/2014 |
| JP | 2015-6890 | 1/2015 |
| JP | 2015-78257 | 4/2015 |
| WO | 2011/118768 | 9/2011 |
| WO | 2012/098513 | 7/2012 |
| WO | 2013/157661 | 10/2013 |

* cited by examiner

POLYCARBONATE RESIN COMPOSITION

TECHNICAL FIELD

The present invention relates to a polycarbonate resin composition having excellent heat resistance, a low water absorption coefficient, high transparency and suppressed deterioration during long-term use.

BACKGROUND ART

Polycarbonate resins, which are excellent in transparency, heat resistance and impact resistance, are widely used in optical media fields, electrical, electronic and OA fields, automobile fields, industrial machinery fields, medical treatment fields and other industrial fields. However, since polycarbonates generally used are produced from petroleum-derived raw materials, concerns over depletion of petroleum resources and an increase in the amount of carbon dioxide in air which causes global warming can be enumerated. Thus, biomass resources, which do not depend on oil as a raw material and effect carbon neutral, which means that the resources do not increase the amount of carbon dioxide even when burnt, are attracting a lot of attention. In the field of polymers, the development of biomass plastics produced from the biomass resources is now actively under way.

Of these, as an amorphous polycarbonate resin obtained from a biomass resource and having high heat resistance, a polycarbonate resin produced from a raw material obtained from an ether diol residue which can be produced from sugar has been contemplated. Especially, polycarbonates containing isosorbide as a monomer have features such as excellent transparency, heat resistance, weathering resistance and pencil hardness, and contemplation has been under way by making use of these features (PTLs 1 and 2).

The above-described polycarbonate resin is generally used in combination with various stabilizers, depending on its applications (PTLs 3 to 5). For example, in PTL 3, addition of a hindered amine-based optical stabilizer as a weather resistance formulation to a copolymer of isosorbide and an alicyclic diol monomer reduces haze increase and yellowness index after weathering resistance test. In PTL 4, a formulation of a colorant and a hindered amine-based optical stabilizer is adopted in a copolymer of isosorbide and an alicyclic diol monomer, which reduces color change and physical property degradation after weathering resistance test. In PTL 5, a formulation of a hindered amine-based optical stabilizer is used in a polymer alloy of an aliphatic polycarbonate, which is a copolymer of isosorbide and an alicyclic diol monomer and an aromatic polycarbonate composed of bisphenol A, improving the color change after weathering resistance test.

As aforementioned, as a weather resistance formulation for a polycarbonate containing isosorbide, hindered amine-based optical stabilizers are widely used. Unfortunately, such a hindered amine-based optical stabilizer is a basic compound and may lead to a concern about acceleration of hydrolysis when contained in a polycarbonate resin. The basicity of a hindered amine-based stabilizer is attributable to its structure, on which the degree of the weathering resistance and the basicity depend. Thus, to combine hydrolytic resistance and weathering resistance, it is necessary to take these factors into consideration. In use for exterior applications, further improvements are required.

CITATION LIST

Patent Literature

[PTL 1]
Japanese Unexamined Patent Application Publication No. 2009-74031
[PTL 2]
Japanese Unexamined Patent Application Publication No. 2009-102537
[PTL 3]
Japanese Unexamined Patent Application Publication No. 2011-219746
[PTL 4]
Japanese Unexamined Patent Application Publication No. 2013-227558
[PTL 5]
Japanese Unexamined Patent Application Publication No. 2012-41467

SUMMARY OF INVENTION

Technical Problem

An object of the present invention is to provide a polycarbonate resin composition having excellent heat resistance, a low water absorption coefficient, high transparency and suppressed deterioration during long-term use.

Solution to Problem

The present inventors have extensively studied and found that a polycarbonate resin composition, which is obtained by combining a polycarbonate resin obtained by polymerization of a diol compound containing isosorbide in the presence of a specific polymerization catalyst with specific additives and that the composition has excellent heat resistance, a low water absorption coefficient, and transparency and is excellent in suppressing deterioration during long-term use, and have completed the present invention.

That is, according to the present invention, the problem of the invention is solved by the followings:

1. A polycarbonate resin composition comprising a polycarbonate resin and 0.001 to 1 parts by weight of an N—R type (R represents an alkyl group) hindered amine-based optical stabilizer per 100 parts by weight of the polycarbonate resin, wherein the polycarbonate resin contains 40 mol % or more of a recurring unit (A) represented by the following formula and satisfies the following formulas (i) to (v):

(i) a metal compound comprising a negative ion represented by the following formula (B) and a positive ion constituted by a metal is used as a polymerization catalyst in an amount of $1\times10^{-9}$ to $1\times10^{-5}$ molar equivalent relative to the total diol compounds used for polymerization;

(ii) the specific viscosity measured with a methylene chloride solution at 20° C. is 0.23 to 0.60;

(iii) the glass transition temperature is 100° C. to 160° C.;

(iv) the saturated water absorption coefficient is 2.5% or less; and (v) the relationship between the glass transition temperature (Tg° C.) and the saturated water absorption coefficient (Wa %) satisfies the following formula (I):

$$2.5 \leq TW \text{ value} = Tg \times 0.04 - Wa \quad (I)$$

[Chem. 1]

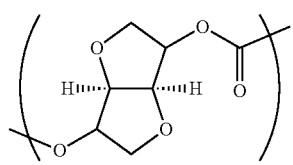

(A)

[Chem. 2]

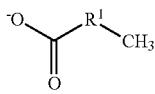
(B)

wherein $R^1$ is an alkylene group, a cycloalkylene group, or an arylalkylene group which has 1 to 22 carbon atoms and may be linear or branched.

2. The polycarbonate resin composition according to item 1, wherein $R^1$ in the formula (B) is a linear alkylene group having 1 to 22 carbon atoms.
3. The polycarbonate resin composition according to item 1 or item 2, wherein the positive ion constituted by a metal in the metal compound is a positive ion constituted by a metal of the group 1 or the group 2 of the long form periodic table.
4. The polycarbonate resin composition according to any of items 1 to 3, wherein the hindered amine-based optical stabilizer is contained at 0.01 to 0.5 parts by weight per 100 parts by weight of the polycarbonate resin.
5. The polycarbonate resin composition according to any of items 1 to 4, further comprising a phosphorus-based antioxidant, wherein the amount of the phosphorus-based antioxidant is 0.001 to 1 parts by weight per 100 parts by weight of the polycarbonate resin.
6. The polycarbonate resin composition according to any of items 1 to 5, further comprising an ultraviolet absorbent, wherein the amount of the ultraviolet absorbent is 0.01 to 2 parts by weight per 100 parts by weight of the polycarbonate resin.
7. The polycarbonate resin composition according to item 6, wherein the ultraviolet absorbent is a benzotriazole-based ultraviolet absorbent.
8. The polycarbonate resin composition according to item 1, wherein the polycarbonate resin further comprises a unit (C-1) represented by the following formula (C-1), and the total amount of the unit (A) and the unit (C-1) is 80 mol % or more of the total amount of the recurring units:

[Chem. 3]

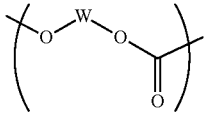
(C-1)

wherein W represents an alkylene group having 2 to 30 carbon atoms or a cycloalkylene group having 6 to 30 carbon atoms.

9. The polycarbonate resin composition according to item 8, wherein the molar ratio (A/C-1) of the unit (A) to the unit (C-1) is 60/40 to 95/5.
10. The polycarbonate resin composition according to item 1, wherein the polycarbonate resin further comprises a carbonate unit (C-2) derived from at least one compound selected from the group consisting of aliphatic diol compounds and alicyclic diol compounds and has a blocking property, and the total amount of the unit (A) and the unit (C-2) is 80 mol % or more of the total amount of the recurring units.
11. The polycarbonate resin composition according to item 10, wherein the molar ratio (A/C-2) of the unit (A) to the unit (C-2) is 60/40 to 98/2.
12. The polycarbonate resin composition according to item 1, wherein the polycarbonate resin further comprises a unit (C-3) represented by the following formula, and the total amount of the unit (A) and the unit (C-3) is 80 mol % or more of the total amount of the recurring units:

[Chem. 4]

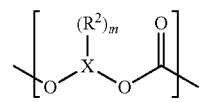
(C-3)

wherein, X represents an alkylene group having 3 to 20 carbon atoms or a cycloalkylene group having 3 to 20 carbon atoms, $R^2$ represents an alkyl group having 1 to 20 carbon atoms or a cycloalkyl group having 3 to 20 carbon atoms, and m represents an integer of 1 to 10.

13. The polycarbonate resin composition according to item 12, wherein the molar ratio (A/C-3) of the unit (A) to the unit (C-3) is 50/50 to 95/5.
14. The polycarbonate resin composition according to item 1, wherein the polycarbonate resin further comprises a carbonate unit (C-4), represented by the following formula, derived from a polyester diol, and the total amount of the unit (A) and the unit (C-4) is 80 mol % or more of the total amount of the recurring units:

[Chem. 5]

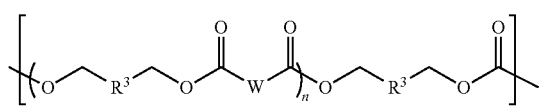
(C-4)

wherein $R^3$ represents a hydrocarbon group having 1 to 12 carbon atoms optionally containing an aromatic group, W represents a hydrocarbon group having 1 to 12 carbon atoms optionally containing an aromatic group, and n represents the average number of the recurring unit.

15. The polycarbonate resin composition according to item 14, wherein the polyester diol has a weight average molecular weight of 100 to 3,000.
16. The polycarbonate resin composition according to item 14, wherein the molar ratio (A/C-4) of the unit (A) to the unit (C-4) is 50/50 to 99/1.
17. A molded product comprising the polycarbonate resin composition according to any of items 1 to 16.

Advantageous Effects of Invention

The polycarbonate resin composition of the present invention has excellent heat resistance, a low water absorption coefficient, surface hardness, practical mechanical strength and excellent transparency, and suppresses deterioration during long-term use, exerting an exceptional industrial effect.

DESCRIPTION OF EMBODIMENTS

The present invention will now be described in detail.
<Method for Producing Polycarbonate Resin>

In the present invention, a diol compound containing a compound of the following formula (a) is used as a raw material for the polycarbonate resin. The amount of the compound of the following formula (a) is 40 mol % or more, preferably 50 mol % or more, more preferably 60 mol % or more, still more preferably 70 mol % or more, and particularly preferably 80 mol % or more of the total diol components.

[Chem. 6]

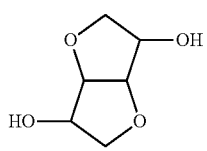

(a)

In the present invention, the diol compound containing the compound of the aforementioned formula (a) is subjected to reaction with a diester carbonate in the presence of a metal compound composed of a specific negative ion and a positive ion constituted by a metal to thereby produce a polycarbonate resin.

The polycarbonate resin of the present invention is produced by a reaction means known per se for producing an ordinary polycarbonate resin, that is, a method for subjecting a diol component to reaction with a diester carbonate. A brief description is subsequently given of basic means for these production methods.

A transesterification reaction using a diester carbonate is carried out by stirring a diol component and the diester carbonate in a predetermined ratio under heating in an inert gas atmosphere and distilling off the alcohol or phenol formed. The reaction temperature, which depends on the boiling point of the alcohol or phenol formed, is generally 120 to 350° C. The reaction is completed while the alcohol or phenol formed is distilled off by setting a reduced pressure from the beginning. A terminating agent, an antioxidant and the like may be added as required.

The carbonate diester used in the above-mentioned transesterification reaction includes esters containing optionally substituted aryl group and aralkyl group having 6 to 12 carbon atoms. Specifically, included are a diphenyl carbonate, ditrier carbonate, bis(chlorophenyl) carbonate, m-cresyl carbonate and the like. Among these, a diphenyl carbonate is particularly preferable. The amount of diphenyl carbonate used is preferably 0.97 to 1.10 moles, and more preferably 1.00 to 1.06 moles based on 1 mole of the total of the diol components.

A polymerization catalyst is used to increase the polymerization rate during polymerization.

An example of the polymerization catalyst is a compound composed of a negative ion represented by the following formula (B) and a positive ion constituted by a metal, and metal compounds, such as alkali metal compounds and alkaline earth metal compounds are preferably used:

[Chem. 7]

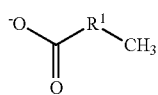

(B)

wherein $R^1$ is an linear or branched alkylene group, a cycloalkylene group, or an arylalkylene group having 1 to 22 carbon atoms.

$R^1$ in the formula is preferably a linear alkylene group. Also, the group has preferably 4 to 22 carbon atoms, more preferably 10 to 22 carbon atoms, and particularly preferably 16 to 22 carbon atoms. The number of carbon atoms within the above range is preferred because the catalyst effect is high, deterioration during long-term use of the polycarbonate resin obtained is suppressed, and such a catalyst is readily available.

In addition, the positive ion composed of metal in the above-mentioned metal compound is preferably a positive ion composed of a group 1 or group 2 metal of the long form periodic table. The specific examples of the metal are lithium, sodium, potassium, cesium, magnesium, calcium, barium, manganese, zinc and the like, and sodium, calcium, barium are preferable.

The specific examples of the above-mentioned metal compound are lithium propionate, sodium propionate, potassium propionate, cesium propionate, magnesium propionate, calcium propionate, strontium propionate, barium propionate, manganese propionate, zinc propionate, aluminum propionate, lithium butyrate, sodium butyrate, potassium butyrate, cesium butyrate, magnesium butyrate, calcium butyrate, strontium butyrate, barium butyrate, manganese butyrate, zinc butyrate, aluminum butyrate, lithium valerate, sodium valerate, potassium valerate, cesium valerate, magnesium valerate, calcium valerate, strontium valerate, barium valerate, manganese valerate, zinc valerate, aluminum valerate, lithium caproate, sodium caproate, potassium caproate, cesium caproate, magnesium caproate, calcium caproate, strontium caproate, barium caproate, manganese caproate, zinc caproate, aluminum caproate, lithium enanthate, sodium enanthate, potassium enanthate, cesium enanthate, magnesium enanthate, calcium enanthate, strontium enanthate, barium enanthate, manganese enanthate, zinc enanthate, aluminum enanthate, lithium caprylate, sodium caprylate, potassium caprylate, cesium caprylate, magnesium caprylate, calcium caprylate, strontium caprylate, barium caprylate, manganese caprylate, zinc caprylate, aluminum caprylate, lithium pelargonate, sodium pelargonate, potassium pelargonate, cesium pelargonate, magnesium pelargonate, calcium pelargonate, strontium pelargonate, barium pelargonate, manganese pelargonate, zinc pelargonate, aluminum pelargonate, lithium caprate, sodium caprate, potassium caprate, cesium caprate, magnesium caprate, calcium caprate, strontium caprate, barium caprate, manganese caprate, zinc caprate, aluminum caprate, lithium undecylate, sodium undecylate, potassium undecylate, cesium undecylate, magnesium undecylate, calcium undecylate, strontium undecylate, barium undecylate, manganese undecylate, zinc undecylate, aluminum undecylate, lithium laurate, sodium laurate, potassium laurate, cesium laurate, magnesium laurate, calcium laurate, strontium laurate, barium laurate, manganese laurate, zinc laurate, aluminium laurate, lithium tridecylate, sodium tridecylate, potassium tridecylate, cesium tridecylate, magnesium tridecylate, calcium tridecylate, strontium tridecylate, barium tridecylate, manganese tridecylate, zinc tridecylate, aluminum tridecylate, lithium myristate, sodium myristate, potassium myristate, cesium myristate, magnesium myristate, calcium myristate, strontium myristate, barium myristate, manganese myristate, zinc myristate, aluminum myristate, lithium pentadecylate, sodium pentadecylate, potassium pentadecylate, cesium pentadecylate, magnesium pentadecylate, calcium pentadecylate, strontium pentadecylate, barium pentadecylate, manganese pentadecylate, zinc pentadecylate, aluminum pentadecylate, lithium palmitate, sodium palmitate, potassium palmitate, cesium palmitate, magnesium palmitate, calcium palmitate, strontium palmitate, barium palmitate, manganese palmitate, zinc palmitate, aluminum palmitate, lithium margarate, sodium margarate, potassium margarate, cesium margarate, magnesium margarate, calcium margarate, strontium margarate, barium margarate, manganese margarate, zinc margarate, aluminum margarate, lithium stearate, sodium stearate, potassium stearate, cesium stearate, magnesium stearate, calcium stearate, strontium stearate, barium stearate, manganese stearate, zinc stearate, aluminum stearate, lithium nonadecylate, sodium nonadecylate, potassium nonadecylate, cesium nonadecylate, magnesium nonadecylate, calcium nonadecylate, strontium nonadecylate, barium nonadecylate, manganese nonadecylate, zinc nonadecylate, aluminum nonadecylate, lithium arachidate, sodium arachidate, potassium arachidate, cesium arachidate, magnesium arachidate, calcium arachidate, strontium arachidate, barium arachidate, manganese arachidate, zinc arachidate, aluminum arachidate, lithium heneicosylate, sodium heneicosylate, potassium heneicosylate, cesium heneicosylate, magnesium heneicosylate, calcium heneicosylate, strontium heneicosylate, barium heneicosylate, manganese heneicosylate, zinc heneicosylate, aluminum heneicosylate, lithium behenate, sodium behenate, potassium behenate, cesium behenate, magnesium behenate, calcium behenate, strontium behenate, barium behenate, manganese behenate, zinc behenate, aluminum behenate, lithium tricosylate, sodium tricosylate, potassium tricosylate, cesium tricosylate, magnesium tricosylate, calcium tricosylate, strontium tricosylate, barium tricosylate, manganese tricosylate, zinc tricosylate, aluminum tricosylate, lithium lignocerate, sodium lignocerate, potassium lignocerate, cesium lignocerate, magnesium lignocerate, calcium lignocerate, strontium lignocerate, barium lignocerate, manganese lignocerate, zinc lignocerate, aluminum lignocerate and the like, and these can be used singly or in combination.

Among these, barium stearate, calcium stearate, sodium stearate, sodium propionate, sodium caprate and sodium lignocerate are preferable, and barium stearate, calcium stearate, sodium stearate, sodium caprate and sodium lignocerate are particularly preferably used.

The above-mentioned metal compounds may be used singly as a polymerization catalyst, and may be used in combination with the following nitrogen-containing compounds.

Nitrogen-containing compounds include quaternary ammonium hydroxides having alkyl and/or aryl groups, such as tetramethylammonium hydroxide, tetraethylammonium hydroxide, tetrapropylammonium hydroxide, tetrabutylammonium hydroxide, trimethylbenzylammonium hydroxide and the like. Also included are tertiary amines such as triethylamine, dimethylbenzylamine, triphenyl amine and the like, and imidazoles such as 2-methylimidazole, 2-phenylimidazole, benzimidazole and the like. Further included are bases or basic salts such as ammonia, tetramethylammonium borohydride, tetrabutylammonium borohydride, tetrabutylammonium tetraphenyl borate, tetraphenyl ammonium tetraphenyl borate and the like.

The amount of the aforementioned metal compound catalyst to be used is in the range of $1\times10^{-9}$ to $1\times10^{-5}$ molar equivalent based on the total diol components. The catalyst is used preferably in an amount of $1\times10^{-8}$ to $1\times10^{-5}$ molar equivalent, more preferably in a range of $1\times10^{-7}$ to $1\times10^{-5}$ molar equivalent, and further preferably in a range of $1\times10^{-6}$ to $1\times10^{-5}$ molar equivalent. An amount of the polymerization catalyst to be used of less than $1\times10^{-9}$ molar equivalent is not preferred because the reaction time is long and the degree of polymerization decreases. An amount of more than $1\times10^{-5}$ molar equivalent is not preferable because the reaction becomes difficult to control.

A catalytic deactivator may also be added at the latter stage of reaction. Well-known catalytic deactivators are used effectively here and among them an ammonium salt, a phosphonium salt of sulfonic acid are preferable. Further, dodecylbenzenesulfonates such as tetrabutylphosphonium dodecylbenzenesulfonate, and p-toluenesulfonate such as tetrabutylammonium p-toluenesulfonate are preferable.

Esters of the sulfonic acid, such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate and the like are preferably used. Among them, tetrabutylphosphonium dodecylbenzenesulfonate is most preferably used.

The amount of the catalyst deactivator based on 1 mole of the polymerization catalyst is preferably 0.5 to 50 moles, more preferably 0.5 to 10 moles, and still more preferably 0.8 to 5 moles.

<Polycarbonate Resin>

The polycarbonate resin of the present invention contains a unit (A) represented by the following formula (A). The amount of the unit (A) is 40 mol % or more, preferably 50 mol % or more, more preferably 60 mol % or more, still more preferably 70 mol % or more, and particularly preferably 80 mol % or more based on the total amount of the recurring units.

[Chem. 8]

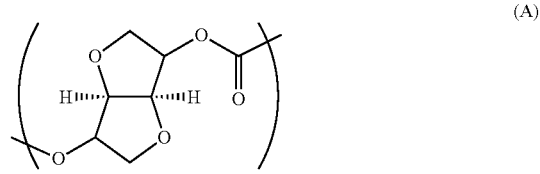

(A)

(Unit (A))

The unit (A) in the present invention is derived from an aliphatic diol, as shown in the formula (A).

Of biomass resources constituting the formula (A), a diol having an ether bond is a material having high heat resistance and pencil hardness.

Examples of the formula (A) include units (A1), (A2), and (A3) represented by the following formulas which are stereoisomeric with one another.

[Chem. 9]

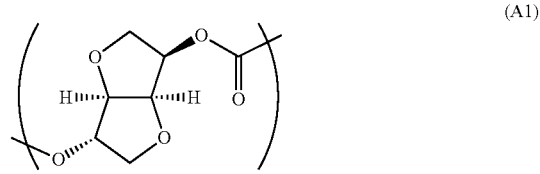

(A1)

-continued

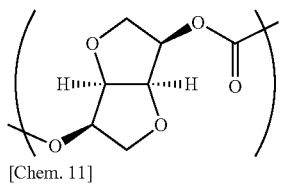

(A2)

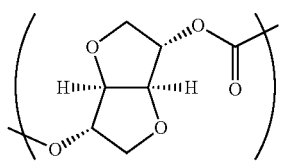

(A3)

These are carbohydrate-derived ether diols, obtained from the biomass of the natural world and called "renewable resources". The recurring units (A1), (A2), and (A3) are respectively called isosorbide, isomannide, and isoidide. Isosorbide is obtained by hydrogenating D-glucose obtained from starch and dehydrating the product obtained. The other ether diols are obtained from reactions similar to the above reaction except for the starting material.

The recurring unit derived from isosorbide (1,4,3,6-dianhydro-D-sorbitol), among isosorbide, isomannide and isoidide, is particularly preferred as it is easily produced and has high heat resistance.

(Unit (C-1))

As one preferred embodiment of the polycarbonate resin produced in the present invention, a copolymer polycarbonate resin comprising the unit (A) and a unit (C-1) represented by the following formula (C-1) can be exemplified, wherein the total amount of the unit (A) and the unit (C-1) is 80 mol % or more and preferably 90 mol % or more of the total amount of the recurring units:

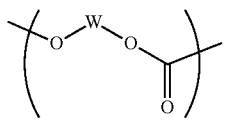

(C-1)

wherein W represents an alkylene group having 2 to 30 carbon atoms or a cycloalkylene group having 6 to 30 carbon atoms.

The unit (C-1) is a carbonate unit derived from at least one compound selected from the group consisting of aliphatic diol compounds and alicyclic diol compounds.

Examples of the aliphatic diol having 2 to 30 carbon atoms include 1,3-propanediol, 1,4-butanediol, 1,5-pentanediol, neopentylglycol, 1,6-hexanediol, 1,7-heptanediol, 1,8-octanediol, 1,9-nonanediol, 2-ethyl-1,6-hexanediol, 2,2,4-trimethyl-1,6-hexanediol, 1,10-decanediol, 1,12-dodecanediol, hydrogenated dilinoleyl glycol, hydrogenated dioleyl glycol and the like. Among them, 1,3-propanediol, 1,4-butanediol, 1,6-hexanediol, 1,8-octanediol, 1,9-nonanediol, 1,10-decanediol and 1,12-dodecanediol are preferable. Particularly preferable are 1,9-nonanediol, 1,10-decanediol and 1,12-dodecanediol.

Specific examples of the alicyclic diol compounds having 6 to 30 carbon atoms include cyclohexanediols such as 1,2-cyclohexanediol, 1,3-cyclohexanediol, 1,4-cyclohexanediol, 2-methyl-1,4-cyclohexanediol and the like, cyclohexanedimethanols such as 1,2-cyclohexanedimethanol, 1,3-cyclohexanedimethanol, 1,4-cyclohexanedimethanol and the like, norbornane dimethanols such as 2,3-norbornane dimethanol, 2,5-norbornane dimethanol and the like, tricyclodecane dimethanol, pentacyclopentadecane dimethanol, 1,3-adamantanediol, 2,2-adamantanediol, decalin dimethanol, 2,2,4,4-tetramethyl-1,3-cyclobutanediol, 3,9-bis(2-hydroxy-1,1-dimethylethyl)-2,4,8,10-tetraoxaspiro[5.5]undecane and the like. Among these, 1,4-cyclohexanedimethanol, tricyclodecane dimethanol and 3,9-bis(2-hydroxy-1,1-dimethylethyl)-2,4,8,10-tetraoxaspiro[5.5]undecane are preferable.

Two or more of these may be used in combination. Particularly, W is preferably an alkylene group having 8 to 12 carbon atoms.

The molar ratio of the unit (A) to the unit (C-1), (A/C-1) is preferably in the range of 60/40 to 95/5, more preferably in the range of 70/30 to 93/7, and still more preferably in the range of 80/20 to 90/10. A molar ratio within the above range is preferred because the balance among heat resistance, surface hardness, a low water absorption coefficient, low temperature properties, impact resistance, low moisture permeability, and weathering resistance is excellent. The molar ratio (A/C-1) can be calculated by measurement using the JNM-AL400 proton NMR manufactured by JEOL LTD.

The diol compound from which units other than the unit (A) and the unit (C-1) are derived may be any of monomer compounds from which the unit (C-2), unit (C-3), or unit (C-4) described below are derived, other aliphatic diol compounds, alicyclic diol compounds, and aromatic dihydroxy compounds. Specific examples include diol compounds described in International Publication No. 2004/111106 and International Publication No. 2011/021720, and oxyalkylene glycols such as diethylene glycol, triethylene glycol, tetraethylene glycol, and polyethylene glycol and the like.

The aromatic dihydroxy compounds include α,α'-bis(4-hydroxyphenyl)-m-diisopropylbenzene (bisphenol M), 9,9-bis(4-hydroxy-3-methylphenyl)fluorene, 1,1-bis(4-hydroxyphenyl)cyclohexane, 1,1-bis(4-hydroxyphenyl)-3,3,5-trimethylcyclohexane, 4,4'-dihydroxy-3,3'-dimethyldiphenylsulfide, bisphenol A, 2,2-bis(4-hydroxy-3-methylphenyl)propane (bisphenol C), 2,2-bis(4-hydroxyphenyl)-1,1,1,3,3,3-hexafluoropropane (bisphenol AF), 1,1-bis(4-hydroxyphenyl)decane and the like.

(Unit (C-2))

As one preferred embodiment of the polycarbonate resin used in the present invention, a copolymer polycarbonate resin comprising the unit (A) and a carbonate unit (C-2) derived from at least one compound selected from the group consisting of aliphatic diol compounds and alicyclic diol compounds may be exemplified, wherein the resin has a blocking property and the total amount of the unit (A) and the unit (C-2) is 80 mol % or more and preferably 90 mol % or more of the total amount of the recurring units. A compound from which units other than the unit (A) and the unit (C-2) are derived (for example, an oxyalkylene glycol or an aromatic dihydroxy compound) may be used.

The aliphatic diol compound may be either a linear aliphatic diol compound or a branched aliphatic diol compound. The linear aliphatic diol compound to be used has preferably 2 to 30 carbon atoms, more preferably 3 to 20 carbon atoms, and still more preferably 3 to 10 carbon atoms. Alternatively, the branched aliphatic diol compound to be used has preferably 3 to 30 carbon atoms, more preferably 3 to 20 carbon atoms, and still more preferably 4 to 12 carbon atoms.

The alicyclic diol compound to be used has preferably 6 to 30 carbon atoms and more preferably 6 to 20 carbon atoms.

Specific examples of linear aliphatic diol compounds include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, hydrogenated dilinoleyl glycol, hydrogenated dioleyl glycol and the like. Among these, preferable are 1,3-propanediol, 1,4-butanediol, 1,6-hexanediol, 1,8-octanediol, 1,9-nonanediol and 1,12-dodecanediol.

Specific examples of branched aliphatic diol compounds include 1,3-butylene glycol, 2-methyl-1,3-propanediol, neopentylglycol, 2-ethyl-1,6-hexanediol, 2,2,4-trimethyl-1,6-hexanediol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexaneglycol, 1,2-octylglycol, 2-ethyl-1,3-hexanediol, 2,3-diisobutyl-1,3-propanediol, 2,2-diisoamyl-1,3-propanediol, 2-methyl-2-propyl-1,3-propanediol and the like. Among these, preferable are 3-methyl-1,5-pentanediol, 2-n-butyl-2-ethyl-1,3-propanediol, 2,2-diethyl-1,3-propanediol, 2,4-diethyl-1,5-pentanediol.

Specific examples of the alicyclic diol compounds include cyclohexanediols such as 1,2-cyclohexanediol, 1,3-cyclohexanediol, 1,4-cyclohexanediol, 2-methyl-1,4-cyclohexanediol and the like, cyclohexanedimethanols such as 1,2-cyclohexanedimethanol, 1,3-cyclohexanedimethanol, 1,4-cyclohexanedimethanol, norbornanedimethanols such as 2,3-norbornane dimethanol, 2,5-norbornane dimethanol and the like, tricyclodecane dimethanol, pentacyclopentadecane dimethanol, 1,3-adamantanediol, 2,2-adamantanediol, decalin dimethanol, 2,2,4,4-tetramethyl-1,3-cyclobutanediol, 3,9-bis(2-hydroxy-1,1-dimethylethyl)-2,4,8,10-tetraoxaspiro[5.5]undecane and the like. Among these, preferable are 1,4-cyclohexanedimethanol, tricyclodecanedimethanol and 3,9-bis(2-hydroxy-1,1-dimethylethyl)-2,4,8,10-tetraoxaspiro[5.5]undecane. These aliphatic diol compounds and alicyclic diol compounds may be used singly or in combination of two kinds or more.

The above polycarbonate copolymer has the blocking property of the unit (C-2). The average number (n) of the recurring unit of the unit (C-2) in the block part is preferably 2 to 100, more preferably 2.2 to 50, still more preferably 2.3 to 30, and particularly preferably 2.5 to 10. Also, the number average molecular weight of the unit (C-2) in the block part is preferably 250 to 5000, more preferably 300 to 3000, still more preferably 300 to 2000, and particularly preferably 350 to 1500. An average number (n) of the recurring units (C-2) and a number average molecular weight of the unit (C-2) in the block part within the above ranges are preferred because targeted water absorption and heat resistance as well as pencil hardness become excellent and phase separation hardly occurs.

The blocking property of the unit (C-2) in the polycarbonate copolymer can be calculated from the carbon of a carbonate measured with $^{13}$C-NMR by dissolving the polycarbonate copolymer in $CDCl_3$. Three signals for [unit (A)-unit (A)] exist at 153 to 154 ppm (because there are three stereoisomers), two signals for [unit (A)-unit (C-2)] exist at 154 to 155 ppm (when there is no stereoisomer of a copolymerized diol, there are two stereoisomers of isosorbide), and a signal for [unit (C-2)-unit (C-2)] is generally measured at 155 to 156 ppm. The average number of the recurring units (C-2) can be calculated from the integrated value of these signals. The average number of the recurring units (C-2) can be obtained from the following equation. Also, the number average molecular weight of the unit (C-2) in the block part is calculated by multiplying the average number of the recurring units by the molecular weight of the recurring unit.

Average number of recurring units(*C*-2)=(integrated value of signals for [unit(*C*-2)–unit(*C*-2)]/integrated value of signals for [unit(*A*)–unit(*C*-2)])× 2+1   [Math. 1]

The molar ratio (A/C-2) of the unit (A) to the unit (C-2) is preferably in the range of 60/40 to 98/2, more preferably in the range of 65/35 to 93/7, and still more preferably in the range of 70/30 to 90/10. A molar ratio within the above range is preferred because the balance among heat resistance, surface hardness, a low water absorption coefficient, low temperature properties, impact resistance, low moisture permeability, and weathering resistance is excellent. The molar ratio (A/C-2) can be calculated by measurement using the JNM-AL400 proton NMR manufactured by JEOL LTD.

As the method for producing a polycarbonate copolymer containing the unit (A) and the unit (C-2) and having the blocking property of the unit (C-2), a method for producing a polycarbonate copolymer is preferred, wherein a polycarbonate oligomer represented by the recurring unit (C-2) from at least one compound selected from the group consisting of an aliphatic diol compound and an alicyclic diol compound is obtained in advance, and subsequently the polycarbonate compound is produced by reacting the polycarbonate oligomer obtained, a monomer from which the unit (A) is derived (for example, isosorbide) and a carbonate precursor.

(i) Method for Producing Polycarbonate Oligomer

The polycarbonate oligomer is produced by a reaction means known per se for producing an ordinary polycarbonate resin, for example, a method in which a diol compound is subjected to reaction with a carbonate precursor such as diester carbonate, or a known method for producing a polycarbonate diol. A brief description is subsequently given of basic means for these production methods.

A transesterification reaction using a diester carbonate as the carbonate precursor is carried out by stirring a diol compound and the diester carbonate in a predetermined ratio under heating in an inert gas atmosphere and distilling off the alcohol or phenol formed. The reaction temperature, which depends on the boiling point of the alcohol or phenol formed, is generally 120 to 300° C. The reaction is carried out while the alcohol or phenol formed is distilled off from the beginning by setting a reduced pressure. An antioxidant and the like may be added as required.

As the diester carbonate used in the above transesterification reaction, the same diester carbonate as the above diester carbonate may be used. As the catalyst, an ordinary transesterification catalyst may be used.

The method for producing a polycarbonate oligomer, which may be carried out in the presence or absence of a catalyst, is preferably carried out in the presence of a catalyst from the viewpoint of reaction efficiency.

The reaction temperature in the method for producing a polycarbonate oligomer is preferably 90 to 230° C., more preferably 100 to 220° C., and still more preferably 120 to 210° C. When the reaction temperature is higher than 230° C., the polycarbonate oligomer obtained may be colored, or an ether structure may be formed.

Since the amount of by-produced alcohol or phenol is relatively small in the initial stage of the reaction in the method for producing a polycarbonate oligomer, the transesterification reaction is carried out under 10 kPa to normal pressure to suppress the distillation of the diester carbonate. In the last stage of the transesterification reaction, for example, after the transesterification reaction proceeds preferably 50% or more, more preferably 70% or more, the transesterification reaction is desirably carried out under a reduced pressure of preferably 0.1 to 10 kPa and more preferably 0.1 to 1 kPa.

The number average molecular weight of the polycarbonate oligomer is preferably 250 to 5,000, more preferably 300 to 3,000, still more preferably 400 to 2,000, and particularly preferably 400 to 1,500. When the number average molecular weight is less than 250, targeted water absorption, heat resistance, and pencil hardness may deteriorate. When the number average molecular weight is more than 5,000, the blocking property becomes extremely high, whereby phase separation tends to occur. The number average molecular weight of the polycarbonate oligomer can be calculated by measuring proton NMR spectra. The amount of the terminal hydroxyl group and the terminal phenyl group are calculated based on the recurring unit by a proton NMR measurement to determine the number average molecular weight from the following equation.

Number average molecular weight of polycarbonate oligomer=(integrated value of signals of recurring unit)/(integrated value of signals of terminal hydroxyl group+integrated value of signals of terminal phenyl group)×2×molecular weight of recurring unit [Math. 2]

The proportion of the terminal hydroxyl group and the terminal phenyl group of the polycarbonate oligomer is not particularly limited and may be any proportion.

The production of the polycarbonate oligomer may be carried out in the same reaction vessel as that for the production of the polycarbonate copolymer or in a different reaction vessel. The polycarbonate oligomer may be taken out from the reaction vessel and kept before use. The polycarbonate oligomer may be purified by filtration or reprecipitation.

(ii) Method for Producing Polycarbonate Copolymer

The polycarbonate copolymer containing the unit (A) and the unit (C-2) and having the blocking property of the unit (C-2) is produced by subjecting the polycarbonate oligomer obtained by the above method, a monomer from which the unit (A) is derived (for example, isosorbide), and a carbonate precursor to reaction by a reaction means known per se for producing an ordinary polycarbonate resin. A brief description is subsequently given of basic means for these production methods.

A transesterification reaction using a diester carbonate as the carbonate precursor is carried out by stirring a diol component and the diester carbonate in a predetermined ratio under heating in an inert gas atmosphere and distilling off the alcohol or phenol formed. The reaction temperature, which depends on the boiling point of the alcohol or phenol formed, is generally 120 to 300° C. The reaction is completed while the alcohol or phenol formed is distilled off by from the beginning setting a reduced pressure. A terminating agent, an antioxidant and the like may be added as required.

The carbonate diester used in the above-mentioned transesterification reaction includes those similar to above-mentioned carbonate diesters. Among these, a diphenyl carbonate is particularly preferable. The amount of the diphenylcarbonate used is preferably 0.97 to 1.10 moles, and more preferably 1.00 to 1.06 moles based on 1 mole of the total of the dihydroxy compounds.

To accelerate the polymerization rate in the melt polymerization method, a polymerization catalyst may be used. As the polymerization catalyst, the same polymerization catalyst (metal compound) as the above may be used.

The amount of the polymerization catalyst to be used is selected from the range of, preferably $1\times10^{-9}$ to $1\times10^{-5}$ molar equivalent, preferably $1\times10^{-8}$ to $1\times10^{-5}$ molar equivalent, and more preferably $1\times10^{-6}$ to $1\times10^{-5}$ molar equivalent based on the diol component.

A catalytic deactivator may also be added at the latter stage of reaction. The above-mentioned catalytic deactivators can be used.

When at least one polymerization catalyst is used, the amount of the catalyst deactivator based on 1 mole of the polymerization catalyst is preferably 0.5 to 50 moles, more preferably 0.5 to 10 moles, and still more preferably 0.8 to 5 moles.

(Unit (C-3))

As one preferred embodiment of the polycarbonate resin produced in the present invention, a copolymer polycarbonate resin comprising the unit (A) and a unit (C-3) represented by the following formula may be exemplified, wherein the total amount of the unit (A) and the unit (C-3) is 80 mol % or more and preferably 90 mol % or more of the total amount of the recurring units:

[Chem. 13]

(C-3)

wherein, X represents an alkylene group having 3 to 20 carbon atoms or a cycloalkylene group having 3 to 20 carbon atoms, $R^2$ represents an alkyl group having 1 to 20 carbon atoms or a cycloalkyl group having 3 to 20 carbon atoms, and m represents an integer of 1 to 10.

The unit (C-3) is a unit derived from an aliphatic diol having a side-chain alkyl group or a side-chain cycloalkyl group.

The unit (C-3) has a total number of carbon atoms of preferably 4 to 12 and more preferably 5 to 10. Within the above range, HDT (heat deflection temperature) of the polycarbonate resin is kept high.

The number of carbon atoms of X (number of main-chain carbon atoms) and the total number of carbon atoms of $R^2$ (number of side-chain carbon atoms) of the unit (C-3) satisfy preferably the following expression (i), more preferably the following expression (i-a), and still more preferably the following expression (i-b). It is preferred that the following expression (i) be satisfied because boiling water resistance becomes excellent and the water absorption coefficient can be greatly reduced.

0.3≤(the number of carbon atoms of the main-chain)/(the number of carbon atoms of the side-chain)≤8 (i)

0.4≤(the number of carbon atoms of the main-chain)/(the number of carbon atoms of the side-chain)≤5 (i-a)

0.5≤(the number of carbon atoms of the main-chain)/(the number of carbon atoms of the side-chain)≤2 (i-b)

(X in Unit (C-3))

In the above formula (C-3), X represents an alkylene group having 3 to 20 carbon atoms or a cycloalkylene group having 3 to 20 carbon atoms.

X is preferably an alkylene group having 3 to 12 carbon atoms, more preferably an alkylene group having 3 to 8 carbon atoms, and further preferably an alkylene groups having 2 to 6 carbon atoms. The alkylene groups include propylene group, butylene group, pentylene group, hexylene group, heptylene group, octylene group and the like.

X is preferably a cycloalkylene group having 3 to 12 carbon atoms, more preferably a cycloalkylene group having 3 to 8 carbon atoms, and further preferably a cycloalkylene groups having 3 to 6 carbon atoms. The cycloalkylene groups include cyclopropylene group, cyclobutylene group, cyclopentylene group, cyclohexylene group, cycloheptylene group, cyclooctylene group and the like.

($R^2$ in Unit (C-3))

In the above formula (C-3), $R^2$ represents an alkyl group having 1 to 20 carbon atoms or a cycloalkyl groups having 3 to 20 carbon atoms.

$R^2$ is preferably an alkyl group having 1 to 12 carbon atoms and more preferably an alkyl group having 1 to 8 carbon atoms. The alkyl groups include methyl group, ethyl group, propyl group, butyl group, pentyl group, hexyl group, heptyl group, octyl group and the like.

$R^2$ is preferably a cycloalkyl group having 3 to 12 carbon atoms and more preferably a cycloalkyl group having 3 to 8 carbon atoms. The cycloalkyl groups include cyclopropyl group, cyclobutyl group, cyclopentyl group, cyclohexyl group, cycloheptyl group, cyclooctyl group and the like.

(m in Unit (C-3))

In the formula (C-3), m is an integer of 1 to 10, preferably an integer of 2 to 8, and more preferably an integer of 2 to 5.

(The Case when X in Unit (C-3) is an Alkylene Group Having 3 to 20 Carbon Atoms)

In unit (C-3), preferably, X is an alkylene group having 3 to 20 carbon atoms, $R^2$ is an alkyl group having 1 to 4 carbon atoms, and m is an integer of 2 to 8. In unit (B), preferably, X is an alkylene group having 3 to 5 carbon atoms, $R^2$ is an alkyl group having 1 to 4 carbon atoms, and m is an integer of 1 to 2.

In unit (C-3), —X{—($R^2$)$_m$}— is preferably a unit represented by the following formula (Ca).

[Chem. 14]

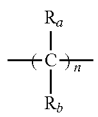

(Ca)

The symbol n is an integer of 2 to 6 and preferably an integer of 3 to 5. n pieces of $R_a$ are each independently selected from the group consisting of hydrogen atom and alkyl group having 1 to 4 carbon atoms. n pieces of $R_b$ are each independently selected from the group consisting of hydrogen atom and alkyl group having 1 to 4 carbon atoms. Among the n pieces of $R_a$ and $R_b$, preferably, one or two are alkyl group(s) having 1 to 4 carbon atoms and others are hydrogen atoms.

In unit (C-3), —X{—($R^2$)$_m$}— is preferably 2-n-butyl-2-ethyl-1,3-propanediyl group, 2,4-diethyl-1,5-pentanediyl group or 3-methyl-1,5-pentanediyl group.

(The Case when X in Unit (C-3) is a Cycloalkylene Group Having 3 to 20 Carbon Atoms)

In the above-mentioned formula (C-3), preferably, X is a cycloalkylene group having 4 to 5 carbon atoms, $R^2$ is an alkyl group having 1 to 10 carbon atoms, and m is an integer of 3 to 12.

The unit (C-3) is preferably a unit represented by the following formula (Cb).

[Chem. 15]

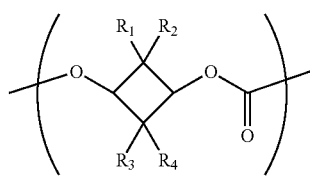

(Cb)

$R_1$, $R_2$, $R_3$ and $R_4$ are each an alkyl group and each may be the same or different, the total carbon atoms of $R_1$-$R_4$ is 4 to 10, and pairs of $R_1$ and $R_2$, and $R_3$ and $R_4$ may each bind with each other to form a carbocyclic ring. $R_1$, $R_2$, $R_3$ and $R_4$ in unit (Cb) are each independently and preferably methyl group, ethyl group or propyl group.

The unit (C-3) is preferably a unit represented by the following formula (Cb-i).

[Chem. 16]

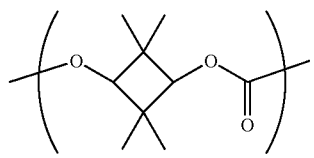

(Cb-i)

The unit (C-3) is derived from an aliphatic diol having a side-chain alkyl group or side-chain cycloalkyl group. Examples of aliphatic diols having a side-chain alkyl group or side-chain cycloalkyl group include 1,3-butylene glycol, 2-methyl-1,3-propanediol, neopentylglycol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexaneglycol, 1,2-octylglycol, 2-ethyl-1,3-hexanediol, 2,3-diisobutyl-1,3-propanediol, 1,12-octadecanediol, 2,2-diisoamyl-1,3-propanediol, 2-methyl-2-propyl-1,3-propanediol, 2-cyclohexyl-1,3-propanediol, 2-methyl-1,4-cyclohexanedimethanol, 2,2,4,4-tetramethyl-1,3-cyclobutanediol and the like.

Among these, preferable are 3-methyl-1,5-pentanediol, 2-n-butyl-2-ethyl-1,3-propanediol, 2,2-diethyl-1,3-propanediol and 2,4-diethyl-1,5-pentanediol, and particularly preferable are 2-n-butyl-2-ethyl-1,3-propanediol and 2,4-diethyl-1,5-pentanediol. These may be used in combination of two kinds or more.

The molar ratio of the unit (A) to the unit (C-3), (A/C-3) is preferably in the range of 50/50 to 95/5, more preferably in the range of 60/40 to 93/7, and still more preferably in the range of 70/30 to 90/10. A molar ratio within the above range is preferred because the balance among heat resistance, surface hardness, a low water absorption coefficient, low temperature properties, impact resistance, low moisture permeability, and weathering resistance is excellent. The molar ratio (A/C-3) can be calculated by measuring using the JNM-AL400 proton NMR manufactured by JEOL LTD.

The diol compound from which units other than the unit (A) and the unit (C-3) are derived may be any of the followings: monomer compounds from which the unit (C-1) or unit (C-2) described above are derived, other than these, aliphatic diol compounds, alicyclic diol compounds, and aromatic dihydroxy compounds. Specific examples include diol compounds described in International Publication No. 2004/111106 or International Publication No. 2011/021720, and oxyalkylene glycols such as diethylene glycol, triethylene glycol, tetraethylene glycol, and polyethylene glycol.

The aliphatic dihydroxy compounds, the alicyclic dihydroxy compounds and the aromatic dihydroxy compounds include the same compounds as above-mentioned.

A copolymerized polycarbonate resin containing the unit (A) and the unit (C-3) is produced by a reaction means known per se for producing an ordinary polycarbonate resin, for example, a method for subjecting a diol component to reaction with a carbonate precursor such as a diester carbonate. The basic means for these production methods are the same as the above means.

(Unit (C-4))

As another preferred embodiment of the polycarbonate resin produced in the present invention, a copolymer polycarbonate resin comprising the unit (A) and a unit (C-4) may be exemplified, wherein the total amount of the unit (A) and the unit (C-4) is 80 mol % or more and preferably 90 mol % or more of the total amount of the recurring units:

The unit (C-4) is a carbonate unit derived from a polyester diol (C4) having dicarboxylic acid and diol as its components.

Suitable dicarboxylic acid is aliphatic carboxylic acid having 4 to 20 carbon atoms, aromatic carboxylic acid or aromatic-aliphatic carboxylic acid. Preferable are at least one kind of dicarboxylic acid selected from the group consisting of 2,2-dimethylmalonic acid, succinic acid, glutaric acid, adipic acid, pimelic acid, sebacic acid, suberic acid, azelaic acid, 1,4-cyclohexanedicarboxylic acid, orthophthalic acid, phthalic anhydride, naphthalic acid, biphenyl dicarboxylic acid, hexahydrophthalic acid, 5-methylisophthalic acid, terephthalic acid and isophthalic acid, and particularly preferable is at least one kind of dicarboxylic acid selected from the group consisting of adipic acid, sebacic acid, 1,4-cyclohexanedicarboxylic acid, terephthalic acid and isophthalic acid. These dicarboxylic acids may be used singly or in combination of two kinds or more.

Suitable diol components include linear aliphatic diol compound, branched aliphatic diol compound and alicyclic diol compound.

Specific examples of linear aliphatic diol compounds include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, hydrogenated dilinoleyl glycol, hydrogenated dioleyl glycol and the like. Among these, preferable are 1,3-propanediol, 1,4-butanediol, 1,6-hexanediol, 1,8-octanediol, 1,9-nonanediol and 1,12-dodecanediol.

Specific examples of branched aliphatic diol compounds include 1,3-butylene glycol, 2-methyl-1,3-propanediol, neopentylglycol, 2-ethyl-1,6-hexanediol, 2,2,4-trimethyl-1,6-hexanediol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexaneglycol, 1,2-octylglycol, 2-ethyl-1,3-hexanediol, 2,3-diisobutyl-1,3-propanediol, 2,2-diisoamyl-1,3-propanediol, 2-methyl-2-propyl-1,3-propanediol, glycerin, trimethylolpropane, pentaerythritol and the like. Among these, preferable are 3-methyl-1,5-pentanediol, 2-n-butyl-2-ethyl-1,3-propanediol, 2,2-diethyl-1,3-propanediol and 2,4-diethyl-1,5-pentanediol.

Specific examples of alicyclic diol compounds include cyclohexanediols such as 1,2-cyclohexanediol, 1,3-cyclohexanediol, 1,4-cyclohexanediol, 2-methyl-1,4-cyclohexanediol and the like, cyclohexanedimethanols such as 1,2-cyclohexanedimethanol, 1,3-cyclohexanedimethanol, 1,4-cyclohexanedimethanol, norbornane dimethanols such as 2,3-norbornane dimethanol, 2,5-norbornane dimethanol and the like, tricyclodecane dimethanol, pentacyclopentadecane dimethanol, 1,3-adamantanediol, 2,2-adamantanediol, decalin dimethanol, 2,2,4,4-tetramethyl-1,3-cyclobutanediol, 3,9-bis(2-hydroxy-1,1-dimethylethyl)-2,4,8,10-tetraoxaspiro[5.5]undecane and the like. Among these, preferable are 1,4-cyclohexanedimethanol, tricyclodecane dimethanol and 3,9-bis(2-hydroxy-1,1-dimethylethyl)-2,4,8,10-tetraoxaspiro[5.5]undecane.

These diol compounds may be used singly or in combination of two kinds or more.

Suitable polyester diol (C-4) is represented by the following formula.

[Chem. 17]

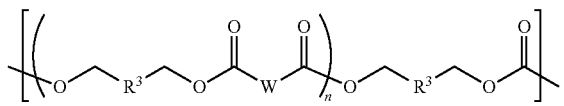

(C-4)

In the formula, $R^3$ represents a hydrocarbon group having 1 to 12 carbon atoms optionally including an aromatic group and is specifically aliphatic or alicyclic moiety of the above-mentioned linear chain aliphatic diol compound, branched aliphatic diol compound or alicyclic diol compound.

W represents a hydrocarbon group having 1 to 12 carbon atoms optionally including an aromatic group and is specifically aliphatic, aromatic or aromatic-aliphatic moiety of the above-mentioned aliphatic carboxylic acid, aromatic carboxylic acid or aromatic-aliphatic carboxylic acid.

The symbol n represents the average number of the recurring unit. As will be described hereinafter, the weight average molecular weight of the polyester diol (C-4) is preferably in the range of 100 to 3,000, and it is preferred to set the average number n of the recurring units so as to obtain this weight average molecular weight.

The polyester diol can be prepared according to a well-known process for manufacturing polyester diol.

The metal-based catalysts used in the process for manufacturing polyester diol include carboxylate of Lewis acid, alkali metal and alkaline earth metals, proton acid, activated clay, acid white clay, ion-exchange resin and the like. The more specific examples are tetrabutoxy titanate, dibutyltin oxide, manganese acetate, cobalt acetate, zinc acetate, zinc benzoate, lithium acetate, sodium acetate, magnesium acetate, calcium acetate, antimony oxide, germanium oxide, phosphoric acid, boric acid, sulfuric acid, p-toluenesulfonic acid, m-sulfonic acid, AMBERLYST E15 and the like. The amount of the catalyst to be used for raw material polyalkylene terephthalate is 10 to 5000 μg and preferably 50 to 1000 μg.

The reaction temperature for carrying out a transesterification reaction in the method for producing a polyester is generally in the range of 150 to 300° C. and preferably in the range of 200 to 250° C. The pressure is not limited, but generally normal pressure to 1 MPa. The reaction time of the transesterification reaction is not particularly limited, but generally 0.5 to 5 hours. The transesterification reaction may be carried out in a batch, semi-batch, or continuous manner.

A glycol component by-produced by the transesterification reaction is distilled off as required. Thereby, the hydroxyl number and viscosity of the polyester diol can be controlled to predetermined ranges. Although there are no particular limiting conditions for distilling off the glycol component, the glycol component is generally distilled off under heating and reduced pressure. Although the glycol component may be distilled off while the reaction is carried out in the presence of a transesterification reaction catalyst or after the completion of the reaction, the glycol component is distilled off preferably during the reaction because it is possible to control the ratio of the acid component and the glycol component during the reaction. The temperature for distilling off the glycol is generally in the range of 150 to 300° C. and preferably in the range of 200 to 250° C. Distilling off the glycol is conducted under a pressure of generally in the range of 0.5 to 0.0001 MPa and preferably in the range of 0.1 to 0.001 MPa.

Impurities such as metal contents may be removed from the polyester diol obtained. Metal contents, especially antimony and germanium, are preferably treated by using an adsorbent and the like. Furthermore, since hydrolyzability and thermal stability deteriorate when the catalyst used for transesterification remains in the diol, the catalyst may be removed by using an adsorbent. A catalyst which is hydrolyzed by water to become a compound insoluble in a diol, such as tetrabutoxy titanate, may be removed by adding water to hydrolyze it so as to precipitate it and separating it by filtration.

The weight average molecular weight of the polyester diol is not particularly limited but preferably 100 to 3,000, more preferably 200 to 2,500, still more preferably 300 to 2,000, particularly preferably 400 to 1,500, and most preferably 450 to 1,000. When the weight average molecular weight of the polyester diol is less than 100, the acid value tends to become large, thereby affecting the polymerization reaction and possibly reducing the productivity. When the weight average molecular weight of the polyester diol is more than 3,000, phase separation tends to occur.

The acid value of the polyester diol is preferably 1 mgKOH/g or less, and more preferably 0.3 mgKOH/g or less. The acid value exceeding 1 mgKOH/g may affect the polymerization reaction, thereby reducing the productivity.

The molar ratio (A/C-4) of the unit (A) to the unit (C-4) is preferably in the range of 50/50 to 99/1, more preferably in the range of 70/30 to 98/2, and still more preferably in the range of 90/10 to 97.5/2.5. A molar ratio within the above range is preferred because the balance among heat resistance, surface hardness, a low water absorption coefficient, low temperature properties, impact resistance, low moisture permeability, and weathering resistance is excellent. The molar ratio (A/C-4) can be calculated by measurement using the JNM-AL400 proton NMR manufactured by JEOL LTD.

A polyester carbonate resin is produced by subjecting the polyester diol obtained by the above method, a monomer inducing the unit (A) (for example, isosorbide) and a carbonate precursor to reaction by a reaction means known per se for producing an ordinary polycarbonate resin. The basic means for these production methods are the same as the above means.

(Terminal Structure)

In the polycarbonate resin of the present invention obtained by conducting the reaction as described above, the terminal structure is of a diol group or a carbonate diester residue, while other terminal group may be separately introduced to the polycarbonate resin used as the base polymer material of the present invention so long as its properties are not impaired. Such a terminal group may be introduced by adding a monohydroxy compound during the polymerization. As a monohydroxy compound, a hydroxy compound of the following formula (2) or (3) is preferably used:

[Chem. 18]

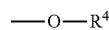

(2)

[Chem. 19]

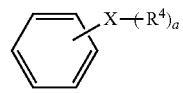

(3)

In the above formulas (2) and (3), $R^4$ is alkyl group having 4 to 30 carbon atoms, aralkyl group having 7 to 30 carbon atoms, perfluoroalkyl group having 4 to 30 carbon atoms or moiety represented by the following formula (4)

[Chem. 20]

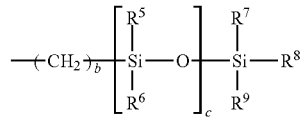

(4)

$R^4$ is preferably an alkyl group having 4 to 20 carbon atoms, a perfluoroalkyl group having 4 to 20 carbon atoms, or the above formula (4), and particularly preferably an alkyl group having 8 to 20 carbon atoms or the above formula (4). X is preferably at least one bond selected from the group consisting of a single bond, an ether bond, a thioether bond, an ester bond, an amino bond, and an amide bond, and more preferably at least one bond selected from the group consisting of a single bond, an ether bond, and an ester bond. Of these, a single bond or an ester bond is preferred. The symbol a is an integer of 1 to 5, preferably an integer of 1 to 3, and particularly preferably 1.

In the above formula (4), $R^5$, $R^6$, $R^7$, $R^8$, and $R^9$ are each independently at least one group selected from the group consisting of an alkyl group having 1 to 10 carbon atoms, a cycloalkyl group having 6 to 20 carbon atoms, an alkenyl group having 2 to 10 carbon atoms, an aryl group having 6 to 10 carbon atoms, and an aralkyl group having 7 to 20 carbon atoms, preferably at least one group selected from the group consisting of an alkyl group having 1 to 10 carbon atoms and an aryl group having 6 to 10 carbon atoms, and particularly preferably at least one group selected from the group consisting of methyl group and phenyl group. The symbol b is an integer of 0 to 3, preferably an integer of 1 to 3, and particularly preferably an integer of 2 or 3. The symbol c is an integer of 4 to 100, preferably an integer of 4 to 50, and particularly preferably an integer of 8 to 50.

The monohydroxy compound used in the present invention is preferably a raw material obtained from renewable resources such as plants. Examples of the monohydroxy compound obtained from plants include long-chain alkyl alcohols having 14 or more carbon atoms obtained from vegetable oils (cetanol, stearyl alcohol, and behenyl alcohol).

(Specific Viscosity: $\eta_{SP}$)

The specific viscosity ($\eta_{SP}$) of the polycarbonate resin used in the present invention is 0.23 to 0.60, preferably 0.25 to 0.55, more preferably 0.30 to 0.50, and particularly preferably 0.35 to 0.45. When the specific viscosity is less than 0.23, the strength of molded article is likely to be reduced. In contrast, when the specific viscosity is more than 0.60, the molding processability during injection molding is likely to be reduced.

The specific viscosity referred to in the present invention is determined in a solution prepared by dissolving 0.7 g of the polycarbonate resin in 100 mL of methylene chloride at 20° C. by using an Ostwald viscometer.

Specific viscosity($\eta_{SP}$)=$(t-t_0)/t_0$

[$t_0$ is the flow down time in seconds for methylene chloride, and t is the flow down time in seconds for a sample solution.]

In this regard, a specific measurement of the specific viscosity can be carried out, for example, as follows. The polycarbonate resin is first dissolved in methylene chloride in an amount of 20 to 30 times the weight of the resin, and the soluble content is collected by Celite filtration. Then, the solvent is removed from the filtrate and the resultant residue is dried completely so as to obtain the solid soluble in methylene chloride. The specific viscosity at 20° C. of a solution prepared by dissolving 0.7 g of the solid in 100 mL of methylene chloride is determined by using an Ostwald viscometer.

In addition, the polycarbonate resin of the present invention can be used in combination of other resins to the extent that the effects of the invention are not impaired.

(Impurities)

The amount of the diol compound in the polycarbonate resin is preferably 700 ppm or less, more preferably 500 ppm or less, and particularly preferably 200 ppm or less in a reaction solution at the outlet of a final polymerization reactor. The concentration of the diester carbonate in the polycarbonate resin of the present invention is preferably 200 ppm by weight or less, more preferably 100 ppm by weight or less, particularly preferably 60 ppm by weight or less, and most preferably 30 ppm by weight or less. The amounts of these impurities can be reduced by controlling the vacuum degree during the polymerization reaction.

(Glass Transition Temperature: Tg)

The glass transition temperature (Tg) of the polycarbonate resin of the present invention is 100 to 160° C., preferably 105° C. to 150° C., and more preferably 110° C. to 140° C. A glass transition temperature (Tg) less than 100° C. is not preferred because it easily causes change in the shape of a molded article during heat treatment. In contrast, a glass transition temperature (Tg) more than 160° C. is not preferred because it deteriorates molding processability during injection molding.

The glass transition temperature (Tg) is measured by using a 2910 DSC of TA Instrument Japan Co., Ltd. at a temperature raising rate of 20° C./min.

(Saturated Water Absorption Coefficient)

The saturated water absorption coefficient of the polycarbonate resin of the present invention is 2.5% or less, preferably 2.2% or less, and more preferably 2.0% or less. A saturated water absorption coefficient of 2.5% or less is preferable because it rarely deteriorates various physical properties in a molded article such as dimensional change and warpage due to water absorption.

(TW Value)

The relationship between the glass transition temperature (Tg° C.) and the water absorption coefficient (Wa %) of the polycarbonate resin of the present invention satisfies the following expression (I), preferably the following expression (I-a), and more preferably the following expression (I-b). The following expression (I) is preferably satisfied because it enables the polycarbonate resin to have excellent heat resistance and a low water absorption coefficient. Although the upper limit of the TW value is not particularly limited, a TW value of 10 or less suffices.

$$2.5 \leq TW \text{ value} = Tg \times 0.04 - Wa \quad (I)$$

$$2.6 \leq TW \text{ value} = Tg \times 0.04 - Wa \quad (I\text{-}a)$$

$$2.7 \leq TW \text{ value} = Tg \times 0.04 - Wa \quad (I\text{-}b)$$

(Total Light Transmittance)

The polycarbonate resin of the present invention has a total light transmittance of preferably 80% or more, more preferably 85% or more, and still more preferably 90% or more.

(Optical Stabilizer)

The polycarbonate resin of the present invention contains an N—R type (R represents an alkyl group) hindered amine-based optical stabilizer. When the optical stabilizer is contained, the resin will have advantages such as satisfactory weathering resistance and crack resistance of a molded article under such conditions.

Optical stabilizers are usually compounds having a 2,2,6,6-tetramethylpiperidine structure as the basic skeleton as shown below, and are known to have different weathering resistance and basicity depending on the type of the substituent bonded to the position 1 of 2,2,6,6-tetramethylpiperidine. The stabilizers are largely divided into three types: the N—H type, the N—R type (R is an alkyl group), and the N—OR type (R is an alkyl group). The N—H type exhibits excellent weathering resistance but has characteristics of high basicity and reducing hydrolytic resistance. The N—OR type, which is a substance having relatively low basicity, has a characteristic of weathering resistance inferior to that of other types.

TABLE 1

| N—H type | N—R type | N—OR type |
|---|---|---|
| (structure with N—H) | (structure with N—R) | (structure with N—OR) |

Thus, considering the weathering resistance and basicity of optical stabilizers, an N—R type optical stabilizer is used in the present invention. Here, R represents an alkyl group. Specific example of the alkyl group includes methyl group, ethyl group, and propyl group, and particularly methyl group is preferred.

Examples of N—R type light stabilizer include bis(1,2,2,6,6-pentamethyl-4-piperidyl) sebacate, 1,2,2,6,6-pentamethyl-4-piperidyl methacrylate, tridecyl alcohol and tridecyl-1,2,3,4-butane tetracarboxylate, bis(1,2,2,6,6-pentamethyl-4-piperidyl)[[3,5-bis(1,1-dimethylethyl)-4- hydroxyphenyl]methyl]butyl malonate, tetrakis(1,2,2,6,6-pentamethyl-4-piperidyl)-1,2,3,4-butane tetracarboxylate, condensate of 1,2,3,4-butane tetracarboxylic acid, 2,2,6,6-tetramethyl-4-piperidinol and β,β,β,β-tetramethyl-3,9-(2,4,8,10-tetraoxaspiro[5,5]undecane-diethanol, hindered amines such as condensate of N,N'-bis(3-aminopropyl)ethylenediamine-2,4-bis[N-butyl-N-(1,2,2,6,6-pentamethyl-4-piperidyl)amino]-6-chloro-1,3,5-triazine and the like. These light stabilizer may be used singly or in combination of two kinds or more. The amount of the light stabilizer is 0.001 to 1 parts by weight based on 100 parts by weight of polycarbonate resin, preferably 0.01 to 0.5 parts by weight, and more preferably 0.03 to 0.3 parts by weight.
(Other Additives)

The polycarbonate resin of the present invention can be blended, depending on the application and need, with additives such as antioxidant, plasticizer, metal polymerization deactivator, flame retardant, lubricant, antistatic agent, surfactant, antifungus agent, ultraviolet absorbent, mold lubricant, filler, shock conditioner and the like.
(Antioxidant)

The polycarbonate resin of the present invention preferably contains an antioxidant in particular to suppress reduction in the molecular weight and deterioration in the hue during extrusion/molding. Examples of the antioxidant include phosphorus-based antioxidants, phenol-based antioxidants, and sulfur-based antioxidants. One of these can be used singly, or two or more of them can be used in combination.

Since the ether diol residue of the unit (A) tends to be degraded and colored by heat and oxygen, a phosphorus-based antioxidant is preferably contained as an antioxidant. As the phosphorus-based antioxidant, a phosphite compound is preferably blended. Examples of the phosphite compound include pentaerythritol type phosphite compounds, phosphite compound which reacts with a dihydric phenol and has a cyclic structure, and phosphite compounds having other structure.

Specific examples of the above-mentioned pentaerythritol type phosphite compounds include distearylpentaerythritoldiphosphite, bis(2,4-di-tert-butylphenyl)pentaerythritoldiphosphite, bis(2,6-di-tert-butyl-4-methylphenyl)pentaerythritoldiphosphite, bis(2,6-di-tert-butyl-4-ethylphenyl)pentaerythritoldiphosphite, phenylbisphenol A pentaerythritoldiphosphite, bis(nonylphenyl)pentaerythritoldiphosphite, dicyclohexylpentaerythritoldiphosphite and the like. Among these, preferable are distearylpentaerythritoldiphosphite and bis(2,4-di-tert-butylphenyl)pentaerythritoldiphosphite.

Examples of the above-mentioned phosphite compounds having cyclic structure after reacting with divalent phenols include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, 2,2'-methylenebis(4-methyl-6-tert-butylphenyl)(2-tert-butyl-4-methylphenyl)phosphite, 2,2'-ethylidenebis(4-methyl-6-tert-butylphenyl)(2-tert-butyl-4-methylphenyl)phosphite, 2,2'-methylene-bis-(4,6-di-t-butylphenyl)octylphosphite, 6-tert-butyl-4-[3-[(2,4,8,10)-tetra-tert-butyldibenzo[d,f][1,3,2]dioxaphosphepin-6-yl)oxy]propyl]-2-methylphenol and the like.

Examples of the above-mentioned phosphite-based compounds with other structure include triphenyl phosphite, tris(nonylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl) phosphite, tris(di-iso-propylphenyl) phosphite, tris(di-n-butylphenyl) phosphite, tris(2,4-di-tert-butylphenyl) phosphite, tris(2,6-di-tert-butylphenyl) phosphite and the like.

As the compounds other than the various phosphite compounds, for example, a phosphate compound, a phoshonite compound and a phosphonate compound are included.

Examples of phosphate compounds include tributyl phosphate, trimethyl phosphate, tricresyl phosphate, triphenyl phosphate, trichlorophenyl phosphate, triethyl phosphate, diphenylcresyl phosphate, diphenyl monoorthoxenyl phosphate, tributoxyethyl phosphate, dibutyl phosphate, dioctyl phosphate, diisopropyl phosphate and the like, and preferable are triphenyl phosphate and trimethyl phosphate.

Examples phoshonite compounds include tetrakis(2,4-di-tert-butylphenyl)-4,4'-biphenylenediphoshonite, tetrakis(2,4-di-tert-butylphenyl)-4,3'-biphenylenediphoshonite, tetrakis(2,4-di-tert-butylphenyl)-3,3'-biphenylenediphoshonite, tetrakis(2,6-di-tert-butylphenyl)-4,4'-biphenylenediphoshonite, tetrakis(2,6-di-tert-butylphenyl)-4,3'-biphenylenediphoshonite, tetrakis(2,6-di-tert-butylphenyl)-3,3'-biphenylenediphoshonite, bis(2,4-di-tert-butylphenyl)-4-phenylphenylphoshonite, bis(2,4-di-tert-butylphenyl)-3-phenylphenylphoshonite, bis(2,6-di-n-butylphenyl)-3-phenylphenylphoshonite, bis(2,6-di-tert-butylphenyl)-4-phenylphenylphoshonite, bis(2,6-di-tert-butylphenyl)-3-phenylphenylphoshonite and the like, preferable are tetrakis(di-tert-butylphenyl)biphenylenediphoshonite and bis(di-tert-butylphenyl)phenyl-phenylphoshonite, and more preferable are tetrakis(2,4-di-tert-butylphenyl)biphenylenediphoshonite and bis(2,4-di-tert-butylphenyl)phenyl-phenylphoshonite. The phoshonite compound can be used preferably in combination with the above-mentioned phosphite compound having an aryl group with two or more alkyl groups substituted.

Examples of phosphonate compounds include dimethylbenzenephosphonate, diethylbenzenephosphonate, dipropylbenzenephosphonate and the like.

In the above-mentioned phosphate antioxidants, preferably used are trisnonylphenylphosphite, trimethylphosphate, tris(2,4-di-tert-butylphenyl)phosphite, bis(2,4-di-tert-butylphenyl)pentaerythritoldiphosphite and bis(2,6-di-tert-butyl-4-methylphenyl)pentaerythritoldiphosphite.

The above-mentioned phosphate antioxidants may be used singly or in combination of two kinds or more. The amount of phosphate antioxidant based on 100 parts by weight of polycarbonate resin is preferably 0.001 to 1 parts by weight, more preferably 0.01 to 0.5 parts by weight, and further preferably 0.03 to 0.3 parts by weight.

In the polycarbonate resin of the present invention, a hindered phenol-based antioxidant or a sulfur-based antioxidant may be added as an antioxidant in combination with a phosphorus-based antioxidant so as to suppress reduction of the molecular weight and deterioration of the hue during extrusion/molding.

The hindered phenol-based antioxidant is not particularly limited as long as it has antioxidant function, and examples include n-octadecyl-3-(4'-hydroxy-3',5'-di-t-butylphenyl) propionate, tetrakis{methylene-3-(3',5'-di-t-butyl-4-hydroxyphenyl)propionate}methane, distearyl(4-hydroxy-3-methyl-5-t-butylbenzyl)malonate, triethyleneglycol-bis{3-(3-t-butyl-5-methyl-4-hydroxyphenyl)propionate}, 1,6-hexanediol-bis{3-(3,5-di-t-butyl-4-hydroxyphenyl) propionate}, pentaerythrityl-tetrakis{3-(3,5-di-t-butyl-4-hydroxyphenyl)propionate}, 2,2-thiodiethylenebis{3-(3,5- di-t-butyl-4-hydroxyphenyl)propionate}, 2,2-thiobis(4-methyl-6-t-butylphenol), 1,3,5-trimethyl-2,4,6-tris(3,5-di-t-butyl-4-hydroxybenzyl)benzene, tris(3,5-di-t-butyl-4-hydroxybenzyl)isocyanurate, 2,4-bis{(octylthio)methyl}-o-cresol, isooctyl-3-(3,5-di-t-butyl-4-hydroxyphenyl) propionate, 2,5,7,8-tetramethyl-2-(4',8',12'-trimethyltridecyl)chroman-6-ol, 3,3',3'',5,5',5''-hexa-t-butyl-a,a',a''-(mesitylene-2,4,6-triyl)tri-p-cresol and the like.

Among these, preferable are n-octadecyl-3-(4'-hydroxy-3',5'-di-t-butylphenyl)propionate, pentaerythrityl-tetrakis{3-(3,5-di-t-butyl-4-hydroxyphenyl)propionate}, 3,3',3'',5,5',5''-hexa-t-butyl-a,a',a'-(mesitylene-2,4,6-triyl)tri-p-cresol, 2,2-thiodiethylenebis{3-(3,5-di-t-butyl-4-hydroxyphenyl) propionate} and the like.

The hindered phenol-based antioxidants may be use singly or in combination of two kinds or more.

The hindered phenol-based antioxidant is in an amount of preferably 0.001 to 1 parts by weight, more preferably 0.01 to 0.5 parts by weight, and further preferably 0.03 to 0.3 parts by weight blended based on 100 parts by weight of polycarbonate resin.

Examples of the sulfur-based antioxidant include dilauryl-3,3'-thiodipropionate, ditridecyl-3,3'-thiodipropionate, dimyristyl-3,3'-thiodipropionate, distearyl-3,3'-thiodipropionate, laurylstearyl-3,3'-thiodipropionate, pentaerythritoltetrakis(3-laurylthiopropionate), bis[2-methyl-4-(3-laurylthiopropionyloxy)-5-tert-butylphenyl]sulfide, octadecyldisulfide, mercaptobenzimidazole, 2-mercapto-6-methylbenzimidazole, 1,1'-thiobis(2-naphthol) and the like. Among these, pentaerythritoltetrakis(3-laurylthiopropionate) is preferable.

The sulfur-based antioxidants may be used singly or in combination of two kinds or more.

The sulfur-based antioxidant is blended in an amount of preferably 0.001 to 1 parts by weight, more preferably 0.01 to 0.5 parts by weight, and further preferably 0.01 to 0.3 parts by weight based on 100 parts by weight of polycarbonate resin.

When phosphite-based antioxidant, phenol-based antioxidant and sulfur-based antioxidant are used in combination, the antioxidant is blended in a total amount of preferably 0.001 to 1 parts by weight and more preferably 0.01 to 0.3 parts by weight based on 100 parts by weight of polycarbonate resin.

(Releasing Agent)

The polycarbonate resin of the present invention may be blended with a releasing agent as long as the object of the present invention is not impaired so as to further improve its releasability from a metal mold at the time of melt molding.

Examples of the releasing agent include a higher fatty acid ester of a monohydric or polyhydric alcohol, higher fatty acid, paraffin wax, beeswax, olefin-based wax, olefin-based wax containing a carboxyl group and/or a carboxylic anhydride group, silicone oil, organopolysiloxane and the like.

The higher fatty acid ester is preferably a partial ester or a whole ester of monohydric or polyhydric alcohol having 1 to 20 carbon atoms and saturated fatty acid having 10 to 30 carbon atoms. Examples of the partial or whole ester of monohydric or polyhydric alcohol and saturated fatty acid include glyceryl monostearate, glyceryl distearate, glyceryl tristearate, sorbitan monostearate, stearyl stearate, glyceryl monobehenate, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, 2-ethylhexy stearate, and the like.

Among these, preferably used are glyceryl monostearate, glyceryl tristearate, pentaerythritol tetrastearate and behenyl behenate.

The higher fatty acid is preferably saturated fatty acid having 10 to 30 carbon atoms. Examples of the fatty acids include myristic acid, lauric acid, palmitic acid, stearic acid, behenic acid and the like.

These mold lubricants may be used singly or in combination of two kinds or more. The amount of such mold lubricants is preferably 0.01 to 5 parts by weight based on 100 parts by weight of polycarbonate resin.

(Ultraviolet Absorbent)

The polycarbonate resin of the present invention may contain an ultraviolet absorbent. Examples of the ultraviolet absorbent include benzotriazole-based ultraviolet absorbents, benzophenone-based ultraviolet absorbents, triazine-based ultraviolet absorbents, cyclic imino ester-based ultraviolet absorbents, and cyanoacrylate-based ultraviolet absorbents, and of these, benzotriazole-based ultraviolet absorbents are preferable.

Examples of the benzotriazole-based ultraviolet absorbent include those represented by 2-(2'-hydroxy-5'-methylphenyl)benzotriazole, 2-(2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl)benzotriazole, 2-(2'-hydroxy-3',5'-di-tert-amylphenyl)benzotriazole, 2-(2'-hydroxy-3'-dodecyl-5'-methylphenyl)benzotriazole, 2-(2'-hydroxy-3',5'-bis(α,α'-dimethylbenzyl)phenylbenzotriazole, 2-[2'-hydroxy-3'-(3'',4'',5'',6''-tetraphthalimidomethyl)-5'-methylphenyl]benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2,2'-methylenebis[4-(1,1,3,3-tetramethylbutyl]-6-(2H-benzotriazol-2-yl)phenol] and methyl-3-[3-tert-butyl-5-(2H-benzotriazol-2-yl)-4-hydroxyphenylpropionate-polyethyleneglycol.

The ratio of such ultraviolet absorbents is preferably 0.01 to 2 parts by weight, more preferably 0.05 to 1 parts by weight, and further preferably 0.1 to 0.5 parts by weight based on 100 parts by weight of polycarbonate resin.

(Bluing Agent)

To the polycarbonate resin of the present invention, a bluing agent may be blended to offset the yellow tint of a lens based on a polymer and an ultraviolet absorbent. A bluing agent which is generally used for polycarbonates may be used without any problem. In general, anthraquinone-based dyes are easily obtained and preferred.

Typical examples of bluing agent specifically include generic name Solvent Violet13 [CA. No (Color Index No) 60725], generic name Solvent Violet31 [CA. No 68210], generic name Solvent Violet33 [CA. No 60725], generic name Solvent Blue94 [CA. No 61500], generic name Solvent Violet36 [CA. No 68210], generic name Solvent Blue97 ["Macrolex Violet RR" manufactured by Bayer AG] and generic name Solvent Blue45 [CA. No 61110].

These bluing agents may be used singly or in combination of two kinds or more. The bluing agents are preferably blended in the ratio of $0.1\times10^{-4}$ to $2\times10^{-4}$ parts by weight based on 100 parts by weight of polycarbonate resin.

(Flame Retardant)

To the polycarbonate resin of the present invention, a flame retardant may be blended. Examples of the flame retardant include halogen-based flame retardants such as brominated epoxy resins, brominated polystyrene, brominated polycarbonate, brominated polyacrylate, chlorinated polyethylene and the like, phosphate-based flame retardants such as monophosphate compounds and phosphate oligomer compounds, organic phosphorus-based flame retardants other than phosphate-based organic flame retardants such as phosphinate compounds, phosphonate compounds, phosphonitrile oligomer compounds, phosphonic acid amide compounds and the like, organic metal salt-based flame retardants such as organic sulfonic acid alkali (alkaline earth) metal salts, metal borate-based flame retardants, metal stannate-based flame retardants and the like, silicone-based flame retardants, ammonium polyphosphate-based flame retardants, and triazine-based flame retardants. Furthermore, flame retardant aid (for example, sodium antimonate, antimony trioxide and the like), dripping preventer (polytetrafluoroethylene having fibril formability and the like) and the like may be separately blended and used in combination with the flame retardant.

Of the above flame retardants, compounds containing none of a chlorine atom and a bromine atom serve to decrease an undesirable factor when incineration disposal or thermal recycling is carried out, so that these compounds are suitable as flame retardants for the molded article of the present invention, which decreases environmental burden as one of the features.

The flame retardant is preferably blended in the range of 0.05 to 50 parts by weight per 100 parts by weight of the polycarbonate resin (component A). When the amount of flame retardant is less than 0.05 part by weight, no sufficient flame retardancy is exhibited. When the amount exceeds 50 parts by weight, the strength and heat resistance of a molded article are impaired.

(Elastic Polymer)

In the polycarbonate resin of the present invention, an elastic polymer as an impact reducing agent may be used. Examples of the elastic polymer include graft copolymers obtained by copolymerization of natural rubber or a rubber component having a glass transition temperature of 10° C. or less with one or two or more of monomers selected from the group consisting of aromatic vinyl compound, vinyl cyanide, acrylate, methacrylate, and vinyl compounds copolymerizable with these. A more suitable elastic polymer is a core-shell type graft copolymer in which a shell of one or two or more of the above monomers are graft-copolymerized on a core of a rubber component.

Another example of the elastic polymer is a block copolymer of the above rubber component and the above monomer. Specific examples of the block copolymer include thermoplastic elastomers such as styrene-ethylenepropylene-styrene elastomers (hydrogenated styrene-isoprene-styrene elastomers), hydrogenated styrene-butadiene-styrene elastomers and the like. Furthermore, various other elastic polymers known as thermoplastic elastomers, such as polyurethane elastomers, polyester elastomers, polyetheramide elastomers and the like also can be used.

A more suitable impact reducing agent is a core-shell type graft copolymer. In the core-shell type graft copolymer, the particle diameter of the core as a weight average particle diameter is preferably 0.05 to 0.8 μm, more preferably 0.1 to 0.6 μm, and still more preferably 0.1 to 0.5 μm. When the particle diameter is in the range of 0.05 to 0.8 μm, excellent impact resistance is accomplished. The elastic polymer preferably contains 40% or more of a rubber component, and more preferably 60% or more.

Examples of the rubber component include butadiene rubber, butadiene-acryl composite rubber, acrylic rubber, acryl-silicone composite rubber, isobutylene-silicone composite rubber, isoprene rubber, styrene-butadiene rubber, chloroprene rubber, ethylene-propylene rubber, nitrile rubber, ethylene-acrylic rubber, silicone rubber, epichlorohydrin rubber, fluorine rubber and those formed by hydrogenation of unsaturated bonding portions of these. Out of concern for emission of harmful substances in combustion, rubber components free of halogen atoms are preferred from the viewpoint of environmental burdens.

The glass transition temperature of the rubber component is preferably −10° C. or less, and more preferably −30° C. or less. Examples of particularly preferable rubber components include butadiene rubber, butadiene-acryl composite rubber, acrylic rubber, and acryl-silicone composite rubber. The composite rubber refers to rubber obtained by copolymerization of two rubber components or rubber having an IPN structure in which two rubber components are inseparably and mutually entangled.

Examples of the aromatic vinyl compound in the vinyl compound to be copolymerized with the rubber component include styrene, α-methylstyrene, p-methylstyrene, alkoxystyrene, halogenated styrene and the like, and particularly, styrene is preferred. Examples of the acrylate include methyl acrylate, ethyl acrylate, butyl acrylate, cyclohexyl acrylate, octyl acrylate and the like, and examples of the methacrylate include methyl methacrylate, ethyl methacrylate, butyl methacrylate, cyclohexyl methacrylate and octyl methacrylate and the like. Particularly, methyl methacrylate is preferred. Of these, particularly preferably contained is methacrylate such as methyl methacrylate and the like as an essential component. More specifically, the amount of the methacrylate per 100% by weight of the graft component (per 100% by weight of a shell in the case of the core-shell polymer) is preferably 10% by weight or more, and more preferably 15% by weight or more.

The elastic polymer containing a rubber component having a glass transition temperature of 10° C. or less may be a polymer produced by any polymerization method of bulk polymerization, solution polymerization, suspension polymerization and emulsion polymerization methods, and the polymerization method may be a single-stage graft method or a multiple-stage graft method. Alternatively, the elastic polymer may be a mixture with a copolymer composed only of graft components that are by-produced during production. In addition to a general emulsion polymerization method, examples of the polymerization method also include a soap-free polymerization method using an initiator such as potassium persulfate and the like, a seed polymerization method, a two-stage swelling polymerization method and the like. Further, in the suspension polymerization method, there may be carried out a method in which an aqueous phase and a monomer phase are separately held and fed accurately to a continuous dispersing machine so as to control a particle diameter on the basis of the rotation speed of the dispersing machine. Also in a continuous production method, there may be carried out a method in which a monomer phase is supplied to an aqueous liquid having dispersing capability through small-diameter orifices having a diameter of several to tens μm or a porous filter so as to control the particle diameter. In the core-shell type graft polymer, the reaction for each of the core and the shell may be a single-stage reaction or a multiple-stage reaction.

These elastic polymers are commercially available and can be obtained easily. Examples of those which mainly contain, as a rubber component, butadiene rubber, acrylic rubber or butadiene-acryl composite rubber include Kane Ace B series (for example, B-56) supplied by Kanegafuchi Chemical Ind. Co., Ltd., METABLEN C series (for example, C-223A) and W series (for example, W-450A) supplied by Mitsubishi Rayon Co., Ltd., Paraloid EXL series (for example, EXL-2602), HIA Series (for example, HIA-15), BTA series (for example, BTA-III) and KCA series supplied by Kureha Chemical Industry Co., Ltd., Paraloid EXL series and KM series (for example, KM-336P and KM-357P) supplied by Rohm & Haas Company, and UCL modifier resin series supplied by Ube Saikon Co., Ltd. (UMG-AXS resin series supplied by UMG-ABS K.K.) Those which mainly contain acryl-silicone composite rubber as a rubber component include a product which is commercially available from Mitsubishi Rayon Co., Ltd. in a trade name of METABLEN S-2001 or SRK-200.

The compositional ratio of the impact reducing agent per 100 parts by weight of the polycarbonate resin (component A) is preferably 0.2 to 50 parts by weight, more preferably 1 to 30 parts by weight, and still more preferably 1.5 to 20 parts by weight. With the compositional range, the composition can be imparted with satisfactory impact resistance while suppressing decrease in the rigidity.

(Method for Producing Polycarbonate Resin Composition)

A blend of a polycarbonate resin and the above various additives can be produced, for example, by premixing each of the components and optional components followed by melt kneading them together and pelletizing the kneaded product. Examples of the premixing means include a Nauter mixer, a twin-cylinder mixer, a Henschel mixer, a mechanochemical machine, and an extrusion mixer. On premixing, granulation can be carried out by means of an extrusion granulator or a briquetting machine. After premixing, the mixture obtained is melt kneaded by means of a melt kneader typified by a vented twin-screw extruder and pelletized by means of a device such as a pelletizer. Other examples of the melt kneader include a Banbury mixer, a kneading roll, and a constant heat stirring vessel, and a vented twin-screw extruder is preferred. Alternatively, the components and the optional components may be supplied into a melt kneader typified by a twin-screw extruder independently without being premixed together. The cylinder temperature during melt kneading is preferably 180 to 270° C., more preferably 190 to 260° C., and still more preferably 200 to 250° C. A cylinder temperature of 270° C. or less is preferred because the thermal decomposition of the polycarbonate proceeds more slowly.

When an extruder is used, it is desirable to dispose a filter in order to prevent scorching of the polycarbonate and inclusion of foreign matter during the extrusion. The rejection size (i.e., opening size) of the filter depends on the desired optical precision. However, the opening size thereof is preferably 100 µm or less. Especially in the case where no inclusion of foreign matter is desired, the opening size of the filter is preferably 40 µm or less and more preferably 10 µm or less. Furthermore, in order to prevent inclusion of foreign matter from occurring after extrusion, it is desirable to conduct the extrusion of the polycarbonate in a clean room.

Furthermore, for cooling and pelletizing the extruded polycarbonate, it is preferred to use a cooling method such as air cooling or water cooling. It is desirable to use air removed of airborne foreign matter beforehand using a high-efficiency particulate air filter or the like for the air cooling, and thus to prevent readhesion of airborne foreign matter. In the case of conducting water cooling, it is desirable to use water removed of metallic substances using an ion-exchange resin or the like and further removed of foreign matter using a filter. Although filters having various opening sizes may be used, a filter having an opening size of 10 to 0.45 µm is preferred.

EXAMPLES

The present invention will be described in detail referring to Examples, while the present invention is not intended to be limited to these. In Examples, "part" stands for "part by weight". Resins and evaluation methods used in Examples are as follows.

1. Polymer Composition Ratio (NMR)

The polymer composition ratio (molar ratio) was determined by measuring each recurring unit using a proton NMR, JNM-AL400 manufactured by JEOL Ltd.

2. Specific Viscosity

The specific viscosity was determined from a solution prepared by dissolving 0.7 g of the polycarbonate resin in 100 mL of methylene chloride by using an Ostwald viscometer (device name: RIGO AUTO VISCOSIMETER TYPE VMR-0525. PC) at 20° C.

$$\text{Specific viscosity}(\eta_{SP})=(t-t_0)/t_0$$

[$t_0$ is the flow down time in seconds for methylene chloride, and t is the flow down time in seconds for a sample solution]

3. Overall Light Transmittance

A thick rectangular plate of thickness 2 mm was molded from the polycarbonate resin pellets obtained by using 75-ton molding machine (JSWJ-75EIII) of Japan Steel Works, Ltd. The overall light transmittance was measured for the above-mentioned molded plate according to JIS K-6735 by using the all integrating sphere type light transmittance measuring machine NDH-2000 (C light source) manufactured by Nippon Denshoku Kogyo Co., Ltd.

4. Glass Transition Temperature (Tg)

Eight milligrams of the polycarbonate resin pellets was used to measure its glass transition temperature in a nitrogen atmosphere (nitrogen flow rate: 40 mL/min) and a temperature elevation rate of 20° C./min by using a DSC-2910 thermal analyzing system manufactured by TA Instruments in compliance with JIS K7121.

5. Water Absorption Coefficient (Wa)

The water absorption coefficient was determined by the following procedure. A 200-mm thick cast film was prepared by dissolving pellets of the polycarbonate resin in methylene chloride and evaporating methylene chloride. The film was dried at 100° C. for 12 hours and then immersed in 25° C. water for 72 hours. The increase in the weight was measured and the water absorption coefficient was calculated according to the following equation.

Water absorption coefficient (%)={(weight of resin after water absorption−weight of resin before water absorption)/(weight of resin before water absorption)}×100

6. TW Value

The TW value was obtained from the following equation:

$$TW \text{ value} = \text{glass transition temperature } (Tg) \times 0.04 - \text{water absorption coefficient } (Wa)$$

7. Specific Viscosity Holding Ratio after Wet Heat Test

The above molded plate was left to stand in a thermostatic bath set to a temperature of 85° C. and a relative humidity of 85% for 1,000 hours. The specimen was measured before and after the wet heat test for specific viscosity by the method of item 2 described above. The resulting values were used to determine a specific viscosity holding ratio {(specific viscosity (after test)/specific viscosity (before test))× 100}, and a ratio of 100% to 95% or more was rated as ⊚, a ratio of less than 95% to 90% or more was rated as ○, a ratio of less than 90% to 80% or more was rated as Δ, and a ratio of less than 80% was rated as x.

8. Specific Viscosity Holding Ratio after Weathering Resistance Test

In compliance with JIS B7753, a square surface of the injection molded flat plate (width 60 mm×length 60 mm×thickness 2 mm) was subjected to an irradiation treatment for 2,000 hours by using Sunshine Weather Meter S80 manufactured by Suga Test Instruments Co., Ltd. with a Sunshine Carbon Arc (four pairs of ultra-long life carbon arc lamps) illuminant by setting the discharge voltage to 50 V and the discharge current to 60 A in the mode of irradiation and surface spray (rainfall) under the conditions of a black panel temperature of 63° C. and a relative humidity of 50%. The time period of surface spray (rainfall) was set to 12 min/hour. The glass filter used was of type A. The specimen was measured before and after the test for specific viscosity by the method of item 2 described above. The resulting values were used to determine a specific viscosity holding ratio {(specific viscosity (after test)/specific viscosity (before test))×100}, and a ratio of 100% to 95% or more was rated as ⊙, a ratio of less than 95% to 90% or more was rated as ○, a ratio of less than 90% to 80% or more was rated as Δ, and a ratio of less than 80% was rated as x.

Production of Polycarbonate Resin

Example 1

In a nitrogen atmosphere, 436 parts of isosorbide (abbreviated as ISS hereinbelow), 65 parts of 1,8-octanediol (abbreviated as OD hereinbelow) and 750 parts of diphenyl carbonate (abbreviated as DPC hereinbelow), and 1.3 μmol of barium stearate as a catalyst, per 1 mol of diol monomer were heated to 180° C. to melt. Thereafter, the decompression degree was adjusted to 13.4 kPa over 30 minutes. Then, the temperature was raised to 250° C. at a rate of 60° C./hr and maintained at that temperature for 10 minutes, and the decompression degree was adjusted to 133 Pa or less over 1 hour. The reaction was conducted for a total of 6 hours under stirring. After the reaction was completed, the resulting product was discharged from the bottom of the reaction tank under a pressurized nitrogen atmosphere and cut with a pelletizer while cooled in a water tank to obtain pellets.

To 100 parts by weight of the pellets obtained, 0.1 parts by weight of ADEKA STAB LA-63P (manufactured by ADEKA Co., Ltd.), which is an amine compound represented by the following structural formula, as an optical stabilizer, 0.05 parts by weight of IRGAFOS 168 (manufactured by BASF Ltd.; tris(2,6-di-tert-butylphenyl)phosphite), which is a phosphorus-based stabilizer, as an antioxidant, and 0.1 parts by weight of IRGANOX 1010 (manufactured by BASF Co., Ltd.), which is a hindered phenol-based stabilizer were blended and mixed homogeneously. The mixture was loaded into an extruder to prepare a resin composition. The extruder used was a vented twin-screw extruder having a diameter of 30 mm φ (manufactured by Japan Steel Works, Ltd., TEX30α-35BW-3V). Pellets were obtained under the extrusion conditions where the discharge rate was 30 to 40 kg/h, the screw rotation speed was 250 rpm and the degree of vacuum in the bent was 3 kPa, and the extrusion temperature from the first feed opening to the die portion was set at 230° C. The evaluation results are shown in Table 1. The pellet was molded into a 2 mm-thick square plate at a cylinder temperature of 240° C. and a mold temperature of 80° C. at a 1-minute cycle by using a J75-ELIII injection molding machine manufactured by The Japan Steel Works, Ltd. The molded specimen was used for various evaluations.

[Chem. 21]

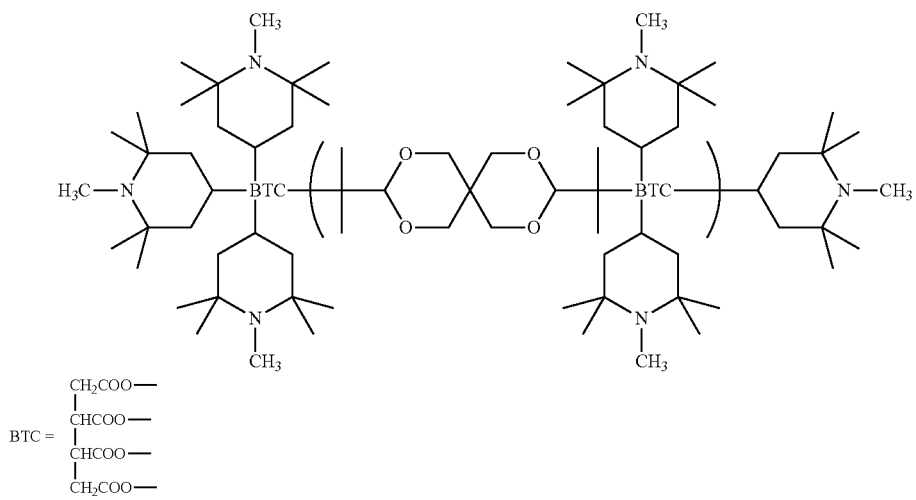

Example 2

Exactly the same operation as in Example 1 was performed except that 1.3 μmol of barium propionate was used as a catalyst for 1 mol of diol monomer, and an evaluation similar to Example 1 was performed. The results are shown in Table 1.

Example 3

Exactly the same operation as in Example 1 was performed except that 0.1 parts by weight of ADEKA STAB LA-52 (product made by ADEKA Co., Ltd.) represented by the following structural formula was used as a light stabilizer, and an evaluation similar to Example 1 was performed. The results are shown in Table 1.

[Chem. 22]

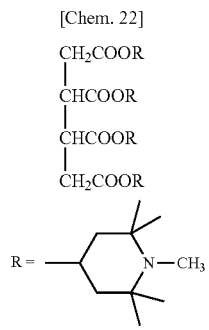

Example 4

Exactly the same operation as in Example 1 was performed except that 0.3 parts by weight of ADEKA STAB LA-31 (product made in ADEKA Co., Ltd.) represented by the following structural formula was added as a ultraviolet absorbent to the composition of Example 1, and an evaluation similar to Example 1 was performed. The results are shown in Table 1.

[Chem. 23]

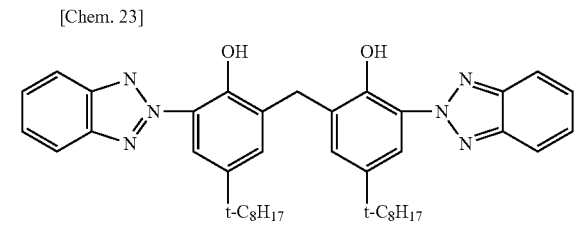

Example 5

Exactly the same operation as in Example 1 was performed except that 5.0 μmol of barium stearate was used as a catalyst for 1 mol of diol monomer, and an evaluation similar to Example 1 was performed. The results are shown in Table 1.

Example 6

Exactly the same operation as in Example 1 was performed except that 0.05 parts by weight of ADEKA STAB LA-63P (product made in ADEKA Co., Ltd.) was used as a light stabilizer, and an evaluation similar to Example 1 was performed. The results are shown in Table 1.

Example 7

Exactly the same operation as in Example 1 was performed except that 0.1 parts by weight of ADEKA STAB LA-31 (product made in ADEKA Co., Ltd.) was added as a ultraviolet absorbent to the composition of Example 1, and an evaluation similar to Example 1 was performed. The results are shown in Table 1.

Example 8

Exactly the same operation as in Example 1 was performed except that 0.1 parts by weight of IRGAFOS 168 (product made in BASF Co., Ltd.) was used as a phosphorus-based antioxidant, and an evaluation similar to Example 1 was performed. The results are shown in Table 1.

Example 9

Exactly the same operation as in Example 1 was performed except that 446 parts of ISS, 60 parts of 1,9-nonanediol (abbreviated as ND hereinafter) and 750 parts of DPC were used as raw materials, and an evaluation similar to Example 1 was performed. The results are shown in Table 1.

Example 10

Exactly the same operation as in Example 1 was performed except that 441 parts of ISS, 72 parts of 1,10-decanediol (abbreviated as DD hereinafter) and 750 parts of DPC were used as raw materials, and an evaluation similar to Example 1 was performed. The results are shown in Table 1.

Example 11

Exactly the same operation as in Example 1 was performed except that 451 parts of ISS, 69 parts of 1,12-dodecanediol (abbreviated as DDD hereinafter) and 750 parts of DPC were used as raw materials, and an evaluation similar to Example 1 was performed. The results are shown in Table 1.

Example 12

Exactly the same operation as in Example 1 was performed except that 296 parts of ISS, 276 parts of tricyclodecane dimethanol (abbreviated as TCDDM hereinafter) and 750 parts of DPC were used as raw materials, and an evaluation similar to Example 1 was performed. The results are shown in Table 1.

Example 13

Exactly the same operation as in Example 1 was performed except that 341 parts of ISS, 158 parts of 1,4-cyclohexanedimethanol (abbreviated as CHDM hereinafter) and 750 parts of DPC were used as raw materials, and an evaluation similar to Example 1 was performed. The results are shown in Table 1.

Example 14

Exactly the same operation as in Example 1 was performed except that 498 parts of ISS, 90 parts of polycarbonate diol (abbreviated as PCD hereinafter) and 750 parts of DPC were used as raw materials, and an evaluation similar to Example 1 was performed. The results are shown in Table 1.

Example 15

Exactly the same operation as in Example 1 was performed except that 351 parts of ISS, 148 parts of 2,2,4,4-tetramethyl-1,3-cyclobutane diol (abbreviated as TMCBD hereinafter) and 750 parts of DPC were used as raw materials, and an evaluation similar to Example 1 was performed. The results are shown in Table 1.

Example 16

Exactly the same operation as in Example 1 was performed except that 320 parts of ISS, 131 parts of TMCBD, 61 parts of ND and 750 parts of DPC were used as raw materials, and an evaluation similar to Example 1 was performed. The results are shown in Table 1.

Example 17

Exactly the same operation as in Example 1 was performed except that 426 parts of ISS, 83 parts of 2,4-diethyl-1,5-pentanediol (abbreviated as DEP hereinafter) and 750 parts of DPC were used as raw materials, and an evaluation similar to Example 1 was performed. The results are shown in Table 1.

Comparative Example 1

Exactly the same operation as in Example 1 was performed except that 0.1 parts by weight of LA-77 (product made by ADEKA Co., Ltd.) represented by the following structural formula was used as a light stabilizer, and an evaluation similar to Example 1 was performed. The results are shown in Table 1.

[Chem. 24]

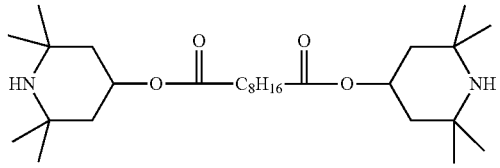

Comparative Example 2

Exactly the same operation as in Example 1 was performed except that 0.1 parts by weight of barium acetate was used as a polymerization catalyst, and an evaluation similar to Example 1 was performed. The results are shown in Table 1.

Comparative Example 3

Exactly the same operation as in Example 1 was performed except that neither light stabilizer nor antioxidant are used, and an evaluation similar to Example 1 was performed. The results are shown in Table 1.

TABLE 2

| | | | Unit | Example 1 | Example 2 | Example 3 | Example 4 | Example 5 | Example 6 |
|---|---|---|---|---|---|---|---|---|---|
| Resin composition | Monomer | ISS | mol % | | | 87 | | | |
| | | OD | | | | 13 | | | |
| | | ND | | | | | | | |
| | | DD | | | | | | | |
| | | DDD | | | | | | | |
| | | TCDDM | | | | | | | |
| | | CHDM | | | | | | | |
| | | PCD | | | | | | | |
| | | TMCBD | | | | | | | |
| | | DEP | | | | | | | |
| | Catalyst | Ba($C_{17}H_{35}COO)_2$ | µmol/ monomer | 1.3 | | 1.3 | 1.3 | 5.0 | 1.3 |
| | | Ba($C_2H_5COO)_2$ | | | 1.3 | | | | |
| | | Ba($CH_3COO)_2$ | | | | | | | |
| | Optical stabilizer | ADEKA STAB LA63P (N-R type) | Parts by weight | 0.10 | 0.10 | | 0.10 | 0.10 | 0.05 |
| | | ADEKA STAB LA52 (N-R type) | | | | 0.10 | | | |
| | | ADEKA STAB LA77Y (N-H type) | | | | | | | |
| | Ultraviolet absorbent | ADEKA STAB LA31 | Parts by weight | | | | 0.30 | | |
| | Antioxidant | IRGAFOS 168 | Parts by weight | 0.05 | 0.05 | 0.05 | 0.05 | 0.05 | 0.05 |
| | | IRGANOX 1010 | | 0.10 | 0.10 | 0.10 | 0.10 | 0.10 | 0.10 |
| Evaluation item | Physical property | Specific viscosity | — | 0.403 | 0.403 | 0.403 | 0.403 | 0.403 | 0.403 |
| | | Total light transmittance | % | 92 | 92 | 92 | 92 | 92 | 92 |
| | | Tg | °C. | 121 | 121 | 121 | 121 | 121 | 121 |
| | | Water absorption coefficient | % | 1.9 | 1.9 | 1.9 | 1.9 | 1.9 | 1.9 |
| | | TW value | — | 2.9 | 2.9 | 2.9 | 2.9 | 2.9 | 2.9 |
| | Specific viscosity holding ratio | Wet heat test | % | 95 | 91 | 91 | 93 | 93 | 96 |
| | | Evaluation | | ◉ | ○ | ○ | ○ | ○ | ◉ |
| | | Weathering resistance test | % | 96 | 94 | 96 | 98 | 94 | 93 |
| | | Evaluation | | ◉ | ○ | ◉ | ◉ | ○ | ○ |

| | | | Unit | Example 7 | Example 8 | Example 9 | Example 10 |
|---|---|---|---|---|---|---|---|
| Resin composition | Monomer | ISS | mol % | | 87 | 89 | 89 |
| | | OD | | | 13 | | |
| | | ND | | | | 11 | |
| | | DD | | | | | 11 |
| | | DDD | | | | | |
| | | TCDDM | | | | | |

TABLE 2-continued

|  |  |  | Unit |  |  |  |  |
|---|---|---|---|---|---|---|---|
|  |  | CHDM |  |  |  |  |  |
|  |  | PCD |  |  |  |  |  |
|  |  | TMCBD |  |  |  |  |  |
|  |  | DEP |  |  |  |  |  |
|  | Catalyst | Ba(C$_{17}$H$_{35}$COO)$_2$ | μmol/ | 1.3 | 1.3 | 1.3 | 1.3 |
|  |  | Ba(C$_2$H$_5$COO)$_2$ | monomer |  |  |  |  |
|  |  | Ba(CH$_3$COO)$_2$ |  |  |  |  |  |
|  | Optical | ADEKA STAB LA63P | Parts by | 0.10 | 0.10 | 0.10 | 0.10 |
|  | stabilizer | (N-R type) | weight |  |  |  |  |
|  |  | ADEKA STAB LA52 |  |  |  |  |  |
|  |  | (N-R type) |  |  |  |  |  |
|  |  | ADEKA STAB LA77Y |  |  |  |  |  |
|  |  | (N-H type) |  |  |  |  |  |
|  | Ultraviolet | ADEKA STAB LA31 | Parts by | 0.10 |  |  |  |
|  | absorbent |  | weight |  |  |  |  |
|  | Antioxidant | IRGAFOS 168 | Parts by | 0.05 | 0.10 | 0.05 | 0.05 |
|  |  | IRGANOX 1010 | weight | 0.10 | 0.10 | 0.10 | 0.10 |
| Evaluation item | Physical | Specific viscosity | — | 0.403 | 0.403 | 0.401 | 0.394 |
|  | property | Total light transmittance | % | 92 | 92 | 92 | 92 |
|  |  | Tg | °C. | 121 | 121 | 121 | 119 |
|  |  | Water absorption coefficient | % | 1.9 | 1.9 | 1.8 | 1.8 |
|  |  | TW value | — | 2.9 | 2.9 | 3.0 | 3.0 |
|  | Specific | Wet heat test | % | 94 | 92 | 93 | 93 |
|  | viscosity |  | Evaluation | ○ | ○ | ○ | ○ |
|  | holding ratio | Weathering resistance test | % | 97 | 94 | 96 | 96 |
|  |  |  | Evaluation | ◎ | ○ | ◎ | ◎ |

|  |  |  | Unit | Example 11 | Example 12 | Example 13 | Example 14 | Example 15 | Example 16 |
|---|---|---|---|---|---|---|---|---|---|
| Resin composition | Monomer | ISS | mol % | 90 | 59 | 70 | 97.5 | 70 | 64 |
|  |  | OD |  |  |  |  |  |  |  |
|  |  | ND |  |  |  |  |  |  | 10 |
|  |  | DD |  |  |  |  |  |  |  |
|  |  | DDD |  |  | 10 |  |  |  |  |
|  |  | TCDDM |  |  |  | 41 |  |  |  |
|  |  | CHDM |  |  |  |  | 30 |  |  |
|  |  | PCD |  |  |  |  | 2.5 |  |  |
|  |  | TMCBD |  |  |  |  |  | 30 | 26 |
|  |  | DEP |  |  |  |  |  |  |  |
|  | Catalyst | Ba(C$_{17}$H$_{35}$COO)$_2$ | μmol/ | 1.3 | 1.3 | 1.3 | 1.3 | 1.3 | 1.3 |
|  |  | Ba(C$_2$H$_5$COO)$_2$ | monomer |  |  |  |  |  |  |
|  |  | Ba(CH$_3$COO)$_2$ |  |  |  |  |  |  |  |
|  | Optical | ADEKA STAB LA63P | Parts by | 0.10 | 0.10 | 0.10 | 0.10 | 0.10 | 0.10 |
|  | stabilizer | (N-R type) | weight |  |  |  |  |  |  |
|  |  | ADEKA STAB LA52 |  |  |  |  |  |  |  |
|  |  | (N-R type) |  |  |  |  |  |  |  |
|  |  | ADEKA STAB LA77Y |  |  |  |  |  |  |  |
|  |  | (N-H type) |  |  |  |  |  |  |  |
|  | Ultraviolet | ADEKA STAB LA31 | Parts by |  |  |  |  |  |  |
|  | absorbent |  | weight |  |  |  |  |  |  |
|  | Antioxidant | IRGAFOS 168 | Parts by | 0.05 | 0.05 | 0.05 | 0.05 | 0.05 | 0.05 |
|  |  | IRGANOX 1010 | weight | 0.10 | 0.10 | 0.10 | 0.10 | 0.10 | 0.10 |
| Evaluation item | Physical | Specific viscosity | — | 0.398 | 0.403 | 0.418 | 0.401 | 0.382 | 0.390 |
|  | property | Total light transmittance | % | 92 | 92 | 92 | 92 | 92 | 92 |
|  |  | Tg | °C. | 120 | 120 | 121 | 121 | 149 | 121 |
|  |  | Water absorption coefficient | % | 1.7 | 2.1 | 2.3 | 2.1 | 2.2 | 1.2 |
|  |  | TW value | — | 3.1 | 2.7 | 2.5 | 2.7 | 3.8 | 3.6 |
|  | Specific | Wet heat test | % | 93 | 95 | 95 | 91 | 94 | 95 |
|  | viscosity |  | Evaluation | ○ | ◎ | ◎ | ○ | ○ | ◎ |
|  | holding ratio | Weathering resistance test | % | 94 | 98 | 98 | 94 | 97 | 96 |
|  |  |  | Evaluation | ○ | ◎ | ◎ | ○ | ◎ | ◎ |

|  |  |  |  | Unit | Example 17 | Comp. ex. 1 | Comp. ex. 2 | Comp. ex. 3 |
|---|---|---|---|---|---|---|---|---|
| Resin composition | Monomer | ISS |  | mol % | 85 | 87 | 87 | 87 |
|  |  | OD |  |  |  | 13 | 13 | 13 |
|  |  | ND |  |  |  |  |  |  |
|  |  | DD |  |  |  |  |  |  |
|  |  | DDD |  |  |  |  |  |  |
|  |  | TCDDM |  |  |  |  |  |  |
|  |  | CHDM |  |  |  |  |  |  |
|  |  | PCD |  |  |  |  |  |  |
|  |  | TMCBD |  |  |  |  |  |  |
|  |  | DEP |  |  | 15 |  |  |  |
|  | Catalyst | Ba(C$_{17}$H$_{35}$COO)$_2$ |  | μmol/ | 1.3 | 1.3 |  | 1.3 |
|  |  | Ba(C$_2$H$_5$COO)$_2$ |  | monomer |  |  | 1.3 |  |
|  |  | Ba(CH$_3$COO)$_2$ |  |  |  |  |  |  |

TABLE 2-continued

| | | | | | | | |
|---|---|---|---|---|---|---|---|
| | Optical stabilizer | ADEKA STAB LA63P (N-R type) | Parts by weight | 0.10 | | 0.10 | |
| | | ADEKA STAB LA52 (N-R type) | | | | | |
| | | ADEKA STAB LA77Y (N-H type) | | | 0.10 | | |
| | Ultraviolet absorbent | ADEKA STAB LA31 | Parts by weight | | | | |
| | Antioxidant | IRGAFOS 168 | Parts by | 0.05 | 0.05 | 0.05 | |
| | | IRGANOX 1010 | weight | 0.10 | 0.10 | 0.10 | |
| Evaluation item | Physical property | Specific viscosity | — | 0.325 | 0.403 | 0.403 | 0.403 |
| | | Total light transmittance | % | 92 | 92 | 92 | 92 |
| | | Tg | °C. | 121 | 121 | 121 | 121 |
| | | Water absorption coefficient | % | 1.8 | 1.9 | 1.9 | 1.9 |
| | | TW value | — | 3.0 | 2.9 | 2.9 | 2.9 |
| | Specific viscosity holding ratio | Wet heat test | % | 95 | 75 | 89 | 96 |
| | | | Evaluation | ◎ | X | Δ | ◎ |
| | | Weathering resistance test | % | 96 | 99 | 95 | 75 |
| | | | Evaluation | ◎ | ◎ | ◎ | X |

Comp. ex.: Comprative example

INDUSTRIAL APPLICABILITY

The polycarbonate resin composition of the present invention has excellent heat resistance, a low water absorption coefficient, surface hardness, practical mechanical strength and excellent transparency and suppresses deterioration during long-term use, and is useful as a molding material for various molded articles.

The invention claimed is:

1. A polycarbonate resin composition comprising a polycarbonate resin and 0.001 to 1 parts by weight of an N—R type (R represents an alkyl group) hindered amine-based optical stabilizer having a 2,2,6,6-tetramethylpiperidine structure as the basic skeleton per 100 parts by weight of the polycarbonate resin, wherein the polycarbonate resin contains 40 mol % or more of a recurring unit (A) represented by the following formula and satisfies the following formulas (i) to (v):
   (i) a metal compound comprising a negative ion represented by the following formula (B) and a positive ion constituted by a metal of the group 2 of the long form periodic table is used as a polymerization catalyst in an amount of $1 \times 10^{-9}$ to $1 \times 10^{-5}$ molar equivalent relative to the total diol compounds used for polymerization;
   (ii) the specific viscosity measured with a methylene chloride solution at 20° C. is 0.23 to 0.60;
   (iii) the glass transition temperature is 100° C. to 160° C.;
   (iv) the saturated water absorption coefficient is 2.5% or less; and
   (v) the relationship between the glass transition temperature (Tg° C.) and the saturated water absorption coefficient (Wa %) satisfies the following formula (I):

$$2.5 \leq TW \text{ value} = Tg \times 0.04 - Wa \quad (I)$$

[Chem. 1]

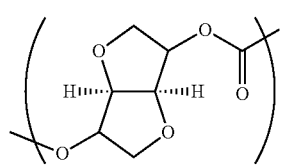
(A)

[Chem. 2]

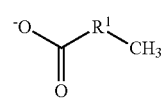
(B)

wherein $R^1$ is an alkylene group, a cycloalkylene group, or an arylalkylene group which has 1 to 22 carbon atoms and may be linear or branched.

2. The polycarbonate resin composition according to claim 1, wherein $R^1$ in the formula (B) is a linear alkylene group having 1 to 22 carbon atoms.

3. The polycarbonate resin composition according to claim 1, wherein the hindered amine-based optical stabilizer is contained at 0.01 to 0.5 parts by weight per 100 parts by weight of the polycarbonate resin.

4. The polycarbonate resin composition according to claim 1, further comprising a phosphorus-based antioxidant, wherein the amount of the phosphorus-based antioxidant is 0.001 to 1 parts by weight per 100 parts by weight of the polycarbonate resin.

5. The polycarbonate resin composition according to claim 1, further comprising an ultraviolet absorbent, wherein the amount of the ultraviolet absorbent is 0.01 to 2 parts by weight per 100 parts by weight of the polycarbonate resin.

6. The polycarbonate resin composition according to claim 5, wherein the ultraviolet absorbent is a benzotriazole-based ultraviolet absorbent.

7. The polycarbonate resin composition according to claim 1, wherein the polycarbonate resin further comprises a unit (C-1) represented by the following formula (C-1), and the total amount of the unit (A) and the unit (C-1) is 80 mol % or more of the total amount of the recurring units:

[Chem. 3]

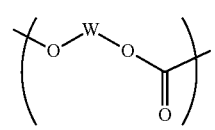
(C-1)

wherein W represents an alkylene group having 2 to 30 carbon atoms or a cycloalkylene group having 6 to 30 carbon atoms.

8. The polycarbonate resin composition according to claim 7, wherein the molar ratio (A/C-1) of the unit (A) to the unit (C-1) is 60/40 to 95/5.

9. The polycarbonate resin composition according to claim 1, wherein the polycarbonate resin further comprises a carbonate unit (C-2) derived from at least one compound selected from the group consisting of aliphatic diol compounds and alicyclic diol compounds and has a blocking property, and the total amount of the unit (A) and the unit (C-2) is 80 mol % or more of the total amount of the recurring units.

10. The polycarbonate resin composition according to claim 9, wherein the molar ratio (A/C-2) of the unit (A) to the unit (C-2) is 60/40 to 98/2.

11. The polycarbonate resin composition according to claim 1, wherein the polycarbonate resin further comprises a unit (C-3) represented by the following formula, and the total amount of the unit (A) and the unit (C-3) is 80 mol % or more of the total amount of the recurring units:

[Chem. 4]

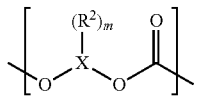

(C-3)

wherein, X represents an alkylene group having 3 to 20 carbon atoms or a cycloalkylene group having 3 to 20 carbon atoms, $R^2$ represents an alkyl group having 1 to 20 carbon atoms or a cycloalkyl group having 3 to 20 carbon atoms, and m represents an integer of 1 to 10.

12. The polycarbonate resin composition according to claim 11, wherein the molar ratio (A/C-3) of the unit (A) to the unit (C-3) is 50/50 to 95/5.

13. The polycarbonate resin composition according to claim 1, wherein the polycarbonate resin further comprises a carbonate unit (C-4), represented by the following formula, derived from a polyester diol, and the total amount of the unit (A) and the unit (C-4) is 80 mol % or more of the total amount of the recurring units:

[Chem. 5]

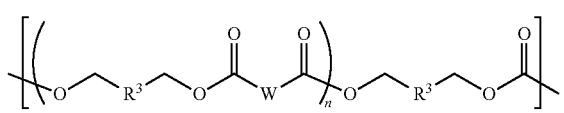

(C-4)

wherein $R^3$ represents a hydrocarbon group having 1 to 12 carbon atoms optionally containing an aromatic group, W represents a hydrocarbon group having 1 to 12 carbon atoms optionally containing an aromatic group, and n represents the average number of the recurring unit.

14. The polycarbonate resin composition according to claim 13, wherein the polyester diol has a weight average molecular weight of 100 to 3,000.

15. The polycarbonate resin composition according to claim 13, wherein the molar ratio (A/C-4) of the unit (A) to the unit (C-4) is 50/50 to 99/1.

16. A molded product comprising the polycarbonate resin composition according to claim 1.

* * * * *